(12) United States Patent
Chung

(10) Patent No.: US 11,868,457 B2
(45) Date of Patent: Jan. 9, 2024

(54) DEVICE AND METHOD FOR AUTHENTICATING USER AND OBTAINING USER SIGNATURE USING USER'S BIOMETRICS

(71) Applicant: NEOPAD, INC., Seoul (KR)

(72) Inventor: Hee Sung Chung, Seoul (KR)

(73) Assignee: NEOPAD INC., Seoul (KR)

(*) Notice: Subject to any disclaimer, the term of this patent is extended or adjusted under 35 U.S.C. 154(b) by 282 days.

(21) Appl. No.: 17/612,109

(22) PCT Filed: May 31, 2019

(86) PCT No.: PCT/KR2019/006588
§ 371 (c)(1),
(2) Date: Nov. 17, 2021

(87) PCT Pub. No.: WO2020/235733
PCT Pub. Date: Nov. 26, 2020

(65) Prior Publication Data
US 2022/0253516 A1  Aug. 11, 2022

(30) Foreign Application Priority Data
May 23, 2019 (KR) ........................ 10-2019-0060543

(51) Int. Cl.
*G06F 21/32* (2013.01)
*G06F 3/0488* (2022.01)
(Continued)

(52) U.S. Cl.
CPC ............ *G06F 21/32* (2013.01); *G06F 3/0488* (2013.01); *G06F 21/46* (2013.01); *H04L 9/0866* (2013.01)

(58) Field of Classification Search
CPC ........ G06F 21/32; G06F 21/46; G06F 3/0488; H04L 9/0866
See application file for complete search history.

(56) References Cited

U.S. PATENT DOCUMENTS 10,250,593 B2 * 4/2019 Aissi ....................... G06F 21/36
2015/0058630 A1 * 2/2015 Bae .......................... G09C 5/00
713/171

(Continued)

FOREIGN PATENT DOCUMENTS

JP       2013-33506 A      2/2013
KR   10-2004-0048115 A     6/2004
(Continued)

OTHER PUBLICATIONS

International Search Report dated Feb. 21, 2020, issued in counterpart International Application No. PCT/KR2019/006588. (2 pages).

*Primary Examiner* — Thaddeus J Plecha
(74) *Attorney, Agent, or Firm* — WHDA, LLP

(57) ABSTRACT

The present invention relates to a device and method for authenticating users and obtaining user signatures, which can be provided in business services using networks and various user information devices including information devices equipped with touch displays such as smartphones, or desktop PCs, laptops, tablet PCs, CCTVs, IoT, self-driving cars, drones, etc. and, more specifically, to a device and method for authenticating users and obtaining user digital signatures which, as an encryption key/password generation and verification system for user authentication to be provided in various web-based businesses in which various information devices are serviced in a client-server or peer-to-peer model network environment and in app-based businesses running on a specific platform, is simpler and ensures confidentiality and security.

12 Claims, 11 Drawing Sheets

(51) Int. Cl.
*G06F 21/46* (2013.01)
*H04L 9/08* (2006.01)

(56) References Cited

U.S. PATENT DOCUMENTS

2019/0050554 A1* 2/2019 Fiske ................... H04L 63/08
2019/0121955 A1* 4/2019 Facon ................... G06F 21/45

FOREIGN PATENT DOCUMENTS

| KR | 10-2004-0070746 A | 8/2004 |
| KR | 10-2018-0013524 A | 2/2018 |
| KR | 10-2018-0069669 A | 6/2018 |

* cited by examiner

FIDO Registration

FIDO Login

DEVICE AND METHOD FOR AUTHENTICATING USER AND OBTAINING USER SIGNATURE USING USER'S BIOMETRICS

TECHNICAL FIELD

The present invention relates to a user authentication and signature device and method which are providable in business services using networks and various user information devices including information devices equipped with touch displays, such as smart phones, or desktop personal computers (PCs), laptops, tablet PCs, closed circuit televisions (CCTVs), Internet of things (IoT) devices, self-driving cars, and drones.

More specifically, the present invention relates to a user authentication and signature device and method that are simple and ensure confidentiality and security as an encryption key/password generation and verification system for user authentication to be provided in various web-based businesses in which various information devices are serviced in a client-server or peer-to-peer model network environment and in app-based businesses running on a specific platform.

BACKGROUND ART

The most important technology field for device, equipment, and service technologies, such as Internet of things (IoT) devices, self-driving cars, drones, referred to as future technologies relates to a "security problem."

In particular, in the IoT in which numerous objects are connected and processed, security technologies are considered more important. Passwords which correspond to the core technology for user authentication among the security technologies greatly require a technology which improves ease of hiding, confidentiality, safety, and convenience of use and also provides a digital signature function and the like.

In general, a user/owner authentication method employs an identification (ID)/password (PW), a personal identification number, or the like. The ID/PW method is inexpensive but lacks security. For example, as a user/owner's PW made by the user combining letters, numerals, signs, etc., a PW having a short length and a pattern which is easy to remember is preferred. Such a PW can be estimated by other people and thus may be illegally used with ease. On the other hand, when a complex and long combination of letters, numerals, signs, etc. is generated as a PW to prevent illegal use, it is difficult for the user/owner to remember the PW. Accordingly, the user/owner records the PW on paper, a universal serial bus (USB) device, or another storage medium and uses the PW on the medium when the PW is necessary. However, even in such a method, PWs have a high risk of illegal use through hacking, stealing, or the like.

According to recent report data (www.fidoalliance.org), there is a serious problem in a PW authentication method which is currently most used. Specifically, according to the recent report data, PWs are the root cause of over 80% of data breaches, users have more than 90 online accounts, up to 51% of PWs are reused, ⅓ of online purchases are abandoned due to forgotten PWs, and $70 is the average help desk labor cost for a single password reset.

Meanwhile, a digital signature function refers to a technology implemented for the purpose of detecting whether user authentication information or user authentication information or a message transmitted and received between a message transmitter and receiver has been tampered by a third party and detecting whether the user authentication information or message has been stolen by a disguised third party and the purpose of nonrepudiation of transmitted and received user authentication information or message transmission and reception.

Also, a technology for recognizing human biometrics, that is, a fingerprint, an iris, a face, a vein, or voice, may be used to replace a user authentication means or a digital signature function. In other words, when a transmitter's bio-information is added to a user authentication information or a message to be transmitted, transmitted and compared with the transmitter's bio-information stored by a receiver, user authentication and signature functions for the transmitter may be simultaneously realized. When human bio-information is used as user authentication or signature information, security is heightened, and it is easy to use. However, when bio-information provided to a third party is stolen or leaked without modification, it is disastrous because the bio-information cannot be changed or altered. Also, the provision of bio-information has legal restrictions on leakage of personal information, and thus it is never desirable to let others, that is, a third party, manage bio-information. This is because, once bio information is stolen, the bio-information cannot be issued again and is highly likely to be permanently misused.

Meanwhile, an international protocol technology for changing the existing PW method and realizing user authentication through a user's biometrics is under development by Fast IDentity Online (FIDO) Alliance. FIDO Alliance is an association which jointly builds a more convenient and secure authentication system and provides technical standards for authentication systems. FIDO Alliance was formed in the summer of 2012 and officially launched in February 2013, and FIDO1.0 was released in December 2014. In 2019, FIDO Alliance and World Wide Web Consortium (W3C) collaborated to determine FIDO 2.0 as a global standard and are actively disseminating FIDO 2.0. Unlike FIDO 1.0 which is a mobile (app)-based biometric authentication standard, FIDO 2.0 is an extended version which allows use in various environments including a mobile environment such as personal computers (PCs) and IoT devices.

FIDO is attracting attention as a next generation authentication technology for collecting information using an authentication device (e.g., a fingerprint recognition device), such as a smart phone, generating an authentication result value through an authenticator, transmitting the authentication result value to a server, and verifying the authentication result value in the server.

FIDO 1.0 and FIDO 2.0 are achieved through two authentication standards, mobile-based universal authentication factor (UAF) and universal $2^{nd}$ factor (U2F). UAF is a mobile-based authentication method for performing authentication by recognizing a user's unique biometrics information such as a fingerprint, voice, or face. According to FIDO 1.0 and FIDO 2.0, after a user is authenticated using bio-information of a user terminal, such as a smart phone, a pair of asymmetric keys (a private key and a public key) are generated, and the public key is registered in a service providing server to perform remote authentication. Also, U2F is a PC-based authentication method in which first authentication is performed according to the ID/PW method and then second authentication is performed using a USB device or a smart card storing a single-use security key.

Meanwhile, in a business based on a cryptocurrency such as Bitcoin, the setting, storage, and management of a secret key which should be performed by a cryptocurrency owner are most important. In other words, when a secret key is lost or stolen through hacking or the like, the same secret key cannot be generated again. Accordingly, there is always a risk that the ownership of the cryptocurrency is lost and all Bitcoin wealth disappears forever.

The secret key is a combination of randomly selected numerals or letters. A person who possesses and dominates the secret key possesses and dominates all the funds associated with the cryptocurrency address. The secret key is used for generating a signature of a cryptocurrency owner, and the right to use the cryptocurrency is given by the signature. Accordingly, a technical configuration related to a secret key of a cryptocurrency owner is the core technical element of cryptocurrency configuration technology.

A currently widely used digital signature technology is based on a technology similar to "public-key cryptography." When a message and a digital signature are sent to a receiver, the receiver decrypts the ciphertext (the signature) with a public key of the sender. When the decrypted message corresponds to the received message, "authentication of the sender" and "nonrepudiation of the sender" can be confirmed. Accordingly, such a function is referred to as a "digital signature method."

Even the digital signature method has a problem. When the public key provided for decryption does not correspond to the public key sent by the sender due to the disguise of a third party, authentication of the sender and nonrepudiation of the sender both fail. A technology proposed to prevent such a risk is a "digital certificate, public certificate" method.

The digital certificate, public certificate method is an infrastructural method in which a third institution referred to as a "certification authority (CA)" is established, and a user registers his or her secret key or public key in the CA, afterward asks the CA to issue a certificate for his or her secret key or public key, and uses the issued certificate as information indicating notarization of the secret key or public key. This digital certificate, that is, the public certificate method also has an economic burden such as the establishment and maintenance cost of a third-party guarantee agency and shows poor usability of users/owners.

DISCLOSURE

Technical Problem

The present invention is directed to providing a user authentication and digital signature function for ensuring confidentiality and safety in various uses described in the Background Art, that is, all application services including the Internet of things (IoT), virtual currency distribution platforms, etc., and a technology for generating a password (PW) or encryption key which is easily generated and conveniently managed by a user or owner and easily memorized. Also, the present invention is directed to providing a device and method for simultaneously providing rapid and economic user authentication and signature functions by controlling user authentication or signature based on a generated PW or encryption key with bio-information.

The present invention is also directed to providing a device and method for simultaneously providing user authentication and signature functions to a service device which are easier and faster than user authentication and signature methods based on Fast IDentity Online (FIDO) standard specifications and protocols employing user biometrics and are secure against illegal use and the like while providing bio-information to a third party when human bio-information is used as user signature information in a web application service or the like.

The present invention is also directed to providing a digital signature device and method which may be used for various purposes, ensure confidentiality and safety without intervention or guarantee of a third institution, such as a certification authority, has digital signature and authentication functions therein, and may be economically operated.

Technical Solution

General user authentication and signature devices register a user's encryption key, essentially include an authentication means for the registered encryption key (password (PW)), and include a device or means for digital signature.

One aspect of the present invention provides a user authentication and signature device employing a user recognition device based on touch data and user biometrics of a user of a touch display in which a device enabling the user to set and register an encryption key of the user includes a user information device including a touch display and a computing function, a user information device including a user biometric recognition processor configured to acquire biometrics of the user from the user using a user bio-input/output device provided in the user information device, store the biometrics in an information device memory of the user, and recognize the user on the basis of the acquired and stored biometrics of the user, a user image data management processor configured to store and manage, in the user information device, specific image data to be displayed on the touch display of the user information device, an encryption key registration window display processor configured to request user encryption key registration on the touch display of the user information device, an encryption key generation image upload processor for user registration/authentication configured to display image data selected by the user or the user image data management processor from among pieces of image data stored in an image storage device of the user information device on the touch display of the user information device by uploading the selected image data in response to the user encryption key registration request, an encryption key generation data acquisition processor for user registration configured to acquire encryption key generation data for user registration when the user designates a specific position pixel in the image data displayed on the touch display of the user information device by the encryption key generation image upload processor for user registration by touching the specific position pixel, and an encryption key generation processor for user registration configured to generate an encryption key for user registration by encrypting the biometrics of the user, which is acquired from the user through the biometrics input/output device and stored in the information device memory of the user, or the encryption key generation data for user registration acquired by the encryption key generation data acquisition processor for user registration. The encryption key generation data acquisition processor for user registration, which acquires the encryption key generation data for user registration when the user designates the specific position pixel in the image data displayed on the touch display of the user information device by the encryption key image upload processor for user registration by touching the specific position pixel, includes at least one of (a) an encryption key generation data acquisition processor for user registration configured to perform a user recognition process of reacquiring biometrics of the user from the user using the biometrics input/output device and confirming that the users are identical to each other by comparing the reacquired biometrics of the user with the previously acquired and stored biometrics of the user, and then acquire coordinate values of the touch pixel and color values of the touch pixel and (b) an encryption key generation data acquisition processor for user registration configured to perform a user recognition process of reacquiring biometrics of the user from the user using the biometrics input/output device and confirming that the users are identical to each other by comparing the reacquired biometrics of the user with the previously acquired and stored biometrics of the user and simultaneously acquire coordinate values of the touch pixel and color values of the touch pixel.

The encryption key generation processor for user registration configured to generate the encryption key for user registration by encrypting the biometrics of the user, which is acquired from the user through the biometrics input/output device and stored in the information device memory of the user, or the encryption key generation data for user registration acquired by the encryption key generation data acquisition processor for user registration may include one of (a) an encryption key generation processor for user registration configured to select at least one of the coordinate values of the touch pixel, the color values of the touch pixel, and the biometrics of the user acquired from the user using the biometrics input/output device and stored in the information device memory of the user, encrypt each piece of the selected data, and generate, as the encryption key for user registration, any one of data obtained by combining the encrypted pieces of data, data obtained by combining one or more of the encrypted pieces of data and the non-encrypted data, and data obtained by re-encrypting the combined data and (b) an encryption key generation processor for user registration configured to combine at least two of the coordinate values of the touch pixel, the color values of the touch pixel, and the biometrics of the user acquired from the user using the biometrics input/output device and stored in the information device memory of the user, encrypt the combined data, and then generate, as the encryption key for user registration, any one of the encrypted data, data obtained by combining the combined and encrypted data and the non-encrypted data, and data obtained by re-encrypting the combined data.

Another aspect of the present invention provides a user authentication and signature device including a user information device including a touch display and a computing function, a user information device including a user biometric recognition processor configured to acquire biometrics of a user from the user using a user bio-input/output device provided in the user information device, store the biometrics in an information device memory of the user, and recognize the user on the basis of the acquired and stored biometrics of the user, a user image data management processor configured to store and manage, in the user information device, specific image data to be displayed on the touch display of the user information device, a processor configured to display an encryption key input window which requests user encryption key authentication on the touch display of the user information device, an encryption key generation image upload processor for user authentication configured to display image data selected by the user or the user image data management processor from among pieces of image data stored in an image storage device of the user information device again on the touch display of the user information device by uploading the selected image data in response to the user encryption key authentication request, an encryption key generation data acquisition processor for user authentication configured to acquire encryption key generation data for user authentication when the user remembers and touches a pixel at the same position as a pixel designated by a touch during user encryption key registration in the image data, an encryption key generation processor for user authentication configured to generate an encryption key for user authentication by encrypting the encryption key generation data for user authentication acquired by the encryption key generation data acquisition processor for user authentication, and an encryption key authentication processor for user registration configured to make a decision by comparing the encryption key generated again by the encryption key generation processor for user authentication with an encryption key already stored in the user information device or a device requesting user encryption key authentication. The encryption key generation data acquisition processor for user authentication, which acquires the encryption key generation data for user authentication when the user remembers and touches the pixel again at the same position as the pixel designated by a touch during user encryption key generation in the image data displayed again by the encryption key generation image upload processor for user authentication, includes one of (a) a processor configured to reacquire biometrics of a user from the user using a biometrics input/output device, confirm that the users are identical to each other by comparing the reacquired biometrics of the user with the previously acquired and stored biometrics of the user, and then acquire, when the user remembers and touches a pixel again at the same position as the pixel designated by the touch during the user encryption key generation in the image data displayed again, coordinate values of the pixel touched again and color values of the pixel touched again and (b) a processor configured to reacquire, when a user remembers and touches a pixel again at the same position as the pixel designated by the touch during the user encryption key registration in the image data displayed again, biometrics of the user and compare the reacquired biometrics of the user with the biometrics of the user stored by the user biometric recognition processor and simultaneously acquire coordinate values of the pixel touched again and color values of the pixel touched again.

The encryption key generation processor for user authentication configured to generate the encryption key for user authentication by encrypting touch data of the user acquired again and the stored biometrics of the user may include any one of (a) an encryption key generation processor for user authentication configured to select at least one of the coordinate values of the pixel touched again, the color values of the pixel touched again, and the biometrics of the user acquired from the user using the biometrics input/output device and stored in the information device memory of the user, encrypt each piece of the selected data, and generate, as the encryption key for user authentication, any one of data obtained by combining the encrypted pieces of data, data obtained by combining one or more of the encrypted pieces of data and the non-encrypted data, and data obtained by re-encrypting the combined data and (b) an encryption key generation processor for user authentication configured to combine at least two of the coordinate values of the pixel touched again, the color values of the pixel touched again, and the biometrics of the user acquired from the user using the biometrics input/output device and stored in the information device memory of the user, encrypt the combined data, and then generate, as the encryption key for user authentication, any one of the encrypted data, data obtained by combining the combined and encrypted data and the non-encrypted data, and data obtained by re-encrypting the combined data.

Another aspect of the present invention provides a user authentication and signature method including acquiring biometrics information of a user from the user using a biometrics input/output device of a user information device and then storing the biometrics information in a memory device in a user biometrics processor of the user information device, receiving an encryption key (PW) registration request from the user, displaying, on a touch display of the user information device, image data selected by the user or an image data processor from among pieces of image data stored in an image storage device of the user information device by uploading the selected image data in response to the encryption key registration request, when the user designates a pixel at a specific position in the image data displayed on the touch display of the user information device by touching the pixel, acquiring coordinate values of the touch pixel and color values of the touch pixel as encryption key generation data for user registration, and combining and encrypting the coordinate values of the touch pixel and the color values of the touch pixel or biometrics data of the user stored in an information device memory of the user and generating an encryption key for user registration with the combined and encrypted data. The acquiring of the coordinate values of the touch pixel and the color values of the touch pixel as the encryption key generation data for user registration when the user designates the pixel at the specific position in the image data displayed on the touch display of the user information device by touching the pixel includes at least one of (a) reacquiring biometrics of the user from the user using the biometrics input/output device, confirming that the users are identical to each other by comparing the reacquired biometrics of the user with the previously acquired and stored biometrics of the user, and then acquiring coordinate values of the touch pixel and color values of the touch pixel and (b) reacquiring biometrics of the user from the user, comparing the reacquired biometrics of the user with the biometrics of the user stored by a user biometrics verification processor, and simultaneously acquiring coordinate values of the touch pixel and color values of the touch pixel.

The combining and encrypting of the coordinate values of the touch pixel and the color values of the touch pixel or the stored biometrics data of the user and generating of the encryption key for user registration with the combined and encrypted data may include one of (a) selecting at least one of the coordinate values of the touch pixel, the color values of the touch pixel, and the biometrics of the user acquired from the user using the biometrics input/output device and stored in the information device memory of the user, encrypting each piece of the selected data, and generating, as the encryption key for user registration, any one of data obtained by combining the encrypted pieces of data, data obtained by combining one or more of the encrypted pieces of data and the non-encrypted data, and data obtained by re-encrypting the combined data and (b) combining at least two of the coordinate values of the touch pixel, the color values of the touch pixel, and the biometrics of the user acquired from the user using the biometrics input/output device and stored in the information device memory of the user, encrypting the combined data, and generating, as the encryption key for user registration, any one of the encrypted data, data obtained by combining the combined and encrypted data and the non-encrypted data, and data obtained by re-encrypting the combined data.

Another aspect of the present invention provides a user authentication and signature method including receiving an authentication request for a registered user encryption key, displaying, on a touch display of a user information device, image data selected for an encryption key for user registration by a user or an image data processor from among pieces of image data stored in an image storage device of the user information device again by uploading the selected image data in response to the authentication request for the user encryption key, acquiring encryption key generation data for user authentication when the user remembers and touches a pixel again at the same position as a pixel designated by a touch during user encryption key registration in the image data displayed again, generating an encryption key for user authentication by encrypting the encryption key generation data for user authentication, and making a decision by comparing the encryption key generated again by an encryption key generation processor for user authentication with an encryption key already stored in the user information device or a device requesting user encryption key authentication. The acquiring of the encryption key generation data for user authentication when the user remembers and touches the pixel again at the same position as the pixel designated by a touch during user encryption key generation in the image data displayed again includes one of (a) reacquiring biometrics of a user from the user using a biometrics input/output device, confirming that the users are identical to each other by comparing the reacquired biometrics of the user with the previously acquired and stored biometrics of the user, and then acquiring, when the user remembers and touches a pixel at the same position as the pixel designated by the touch during the user encryption key generation in the image data displayed again, coordinate values of the pixel touched again and color values of the pixel touched again and (b) reacquiring, when a user remembers and touches a pixel again at the same position as the pixel designated by the touch during the user encryption key registration in the image data displayed again, biometrics of the user, comparing the reacquired biometrics of the user with the biometrics of the user stored by a user biometric recognition processor, and simultaneously acquiring coordinate values of the pixel touched again and color values of the pixel touched again.

The generating of the encryption key for user authentication by re-encrypting the coordinate values of the pixel touched again and the color values of the pixel touched again or stored biometrics information of the user may include one of (a) selecting at least one of the coordinate values of the pixel touched again, the color values of the pixel touched again, and the biometrics of the user acquired from the user using the biometrics input/output device and stored in an information device memory of the user, encrypting each piece of the selected data, and generating, as the encryption key for user authentication, any one of data obtained by combining the encrypted pieces of data, data obtained by combining one or more of the encrypted pieces of data and the non-encrypted data, and data obtained by re-encrypting the combined data and (b) combining at least two of the coordinate values of the pixel touched again, the color values of the pixel touched again, and the biometrics of the user acquired from the user using the biometrics input/output device and stored in the information device memory of the user, encrypting the combined data, and then generating, as the encryption key for user authentication, any one of the encrypted data, data obtained by combining the combined and encrypted data and the non-encrypted data, and data obtained by re-encrypting the combined data.

Meanwhile, the generating of the encryption key for user authentication by encrypting the acquired coordinate values of the touch pixel, the acquired color values of the touch pixel, or the biometrics of the user may include encrypting the acquired coordinate values of the touch pixel, the acquired color values of the touch pixel, or the biometrics of the user and generating the encryption key from the encrypted data using a one-way hash function or an elliptic curve equation.

The generating of the encryption key for user authentication by re-encrypting reacquired coordinate values of a representative pixel at the same touch point, reacquired color values of the representative pixel, or the stored biometrics of the user may include encrypting the reacquired coordinate values of the representative pixel at the same touch point, the reacquired color values of the representative pixel, or the stored biometrics of the user and generating the encryption key from the encrypted data using a one-way hash function or an elliptic curve equation.

Advantageous Effects

According to the present invention, it is possible to provide a user authentication and signature device and method that are more convenient, safer, and more confidential than user authentication and signature devices and methods according to Fast IDentity Online (FIDO) 1.0 and FIDO 2.0 specifications and protocols which are international standards.

According to the present invention, it is possible to provide a user authentication and signature system based on three types of unique authentication information of a user. Specifically, with a user authentication and signature system based on a user's knowledge information, ownership information, and bio-information, it is possible to provide a user authentication and signature device of a new ecosystem which has no signature system unlike FIDO standards and protocols, in which user bio-information that is unique personal information of the user is at no risk of being illegally used even when being provided to a service device of a third party, and in which user bio-information can be safely used regardless of loss because the user bio-information is useless for third parties.

According to the present invention, as long as only an encryption key generation process is remembered, it is possible to safely provide an easy user authentication and signature method with one password (PW) at all times in various devices and services in the same way without having to store an encryption key in another device or the like.

According to the present invention, it is possible to conveniently generate an encryption key of a user which is easily remembered and hidden using a specific photo/image of the user, and it is possible to provide an integrated user authentication and signature device which has excellent confidentiality, safety, and reproducibility in the Internet of things (IoT), cryptocurrency circulation, or application services for various uses using biometrics of the user as well.

According to the present invention, since it is unnecessary to provide a tool, such as a random number generator, to generate an encryption key (a private key/public key), it is possible to provide an economic user authentication and signature device.

According to the present invention, when a user's image/photo is added to the user's biometrics which is a user authenticator of an existing FIDO standard method and the combination is determined as a multimodal authenticator, it is possible to further increase the user's convenience. Also, when the multimodal authenticator is added to a public signature method which is the digital signature method of a current FIDO standard, it is possible to provide a strong user signature method without changing the FIDO standard.

MODES OF THE INVENTION

Figure 1:
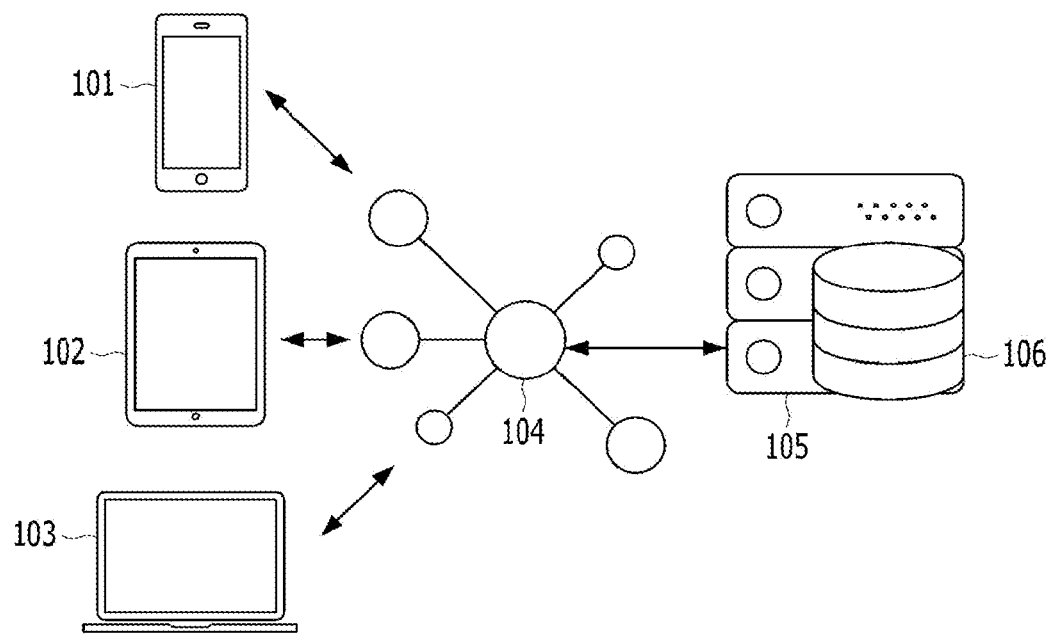
FIGS. 1(a) and 1(b) are a set of example diagrams of a network model in which a user authentication and signature device according to an embodiment of the present invention is implemented.
Figure 1:
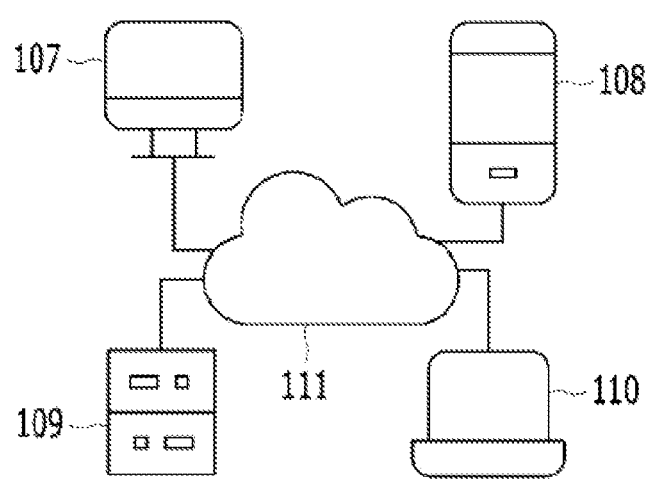
Figure 2:
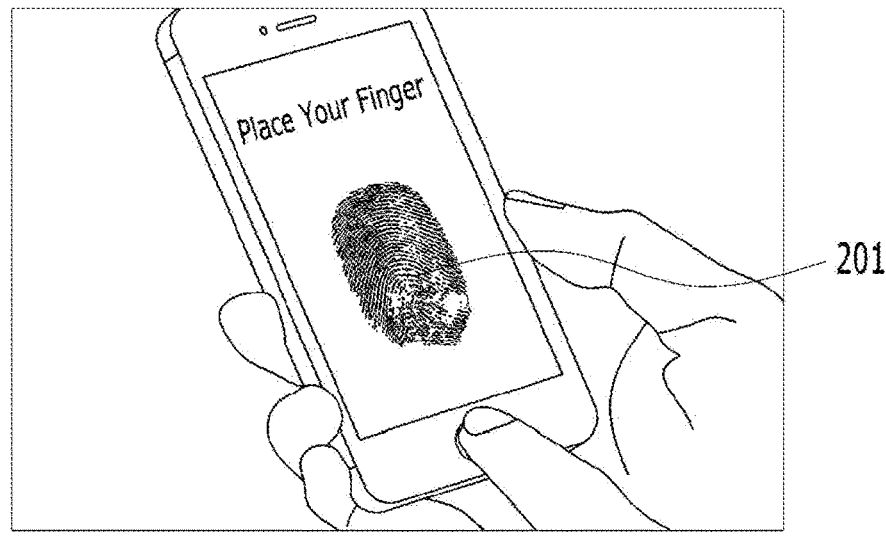
FIGS. 2(a)-2(d) are a set of example diagrams illustrating the processing of a user's biometrics.
Figure 2:
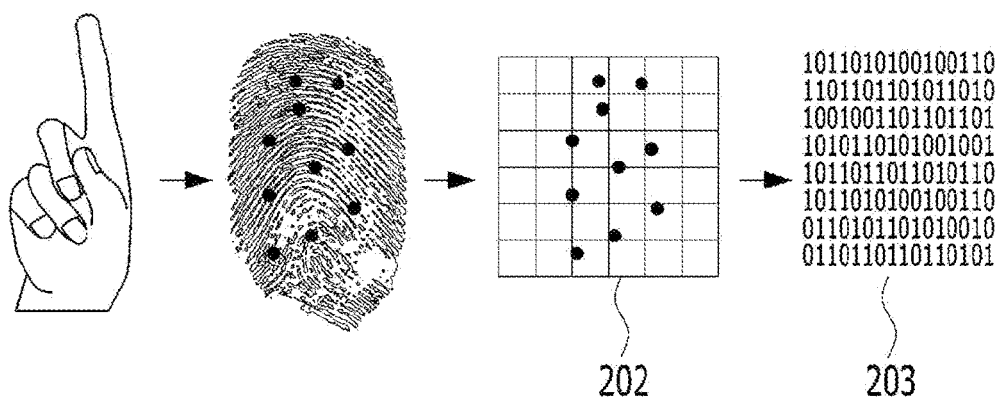
Figure 2:
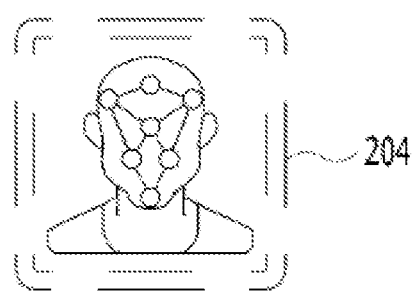
Figure 2:
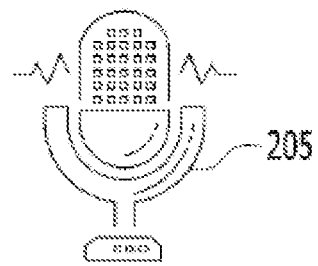

Hereinafter, embodiments of the present invention will be described with reference to the accompanying drawings so that those skilled in the technical field to which the present invention pertains can easily implement the embodiments. However, the present invention can be implemented in various forms and is not limited to the embodiments set forth herein.

Technical terms used herein will be described to aid in understanding the technology of the present invention.

User authentication is a verification procedure performed, when a user uses a certain service or information, to grant the user the right to use the service or information. In other words, user authentication refers to a process of making a user register an identification (ID), a password (PW), or the like for identifying the user and then authenticating whether the user is a user who has the use rights by comparing an ID or PW provided by the user with the registered ID or PW. Meanwhile, a user signature device refers to a device having a function of detecting tampering of an ID or PW of a user, a function of detecting camouflage of a third party, and a nonrepudiation function.

In this specification, an encryption key has the same meaning as a user's secret number, secret key, or PW which are generally used. An encryption key may also be used with the same meaning as a private key and a public key in the cryptography field. According to an embodiment, an encryption key may mean a user encryption key, an encryption key for user registration, or an encryption key for user authentication and may mean a hash value encryption key when the encryption key is encrypted using a hash function. Also, a user's biometrics information, that is, information on a fingerprint, an iris, a face, a blood vessel, voice data, etc., is expressed as the user's biometrics.

In this specification, the high confidentiality of a PW/encryption key means that it is extremely difficult to decrypt the PW/encryption key even with high-performance computer processing because a source for generating the PW/encryption key has high entropy, that is, high randomness, and the PW/encryption secret key is long enough. Also, the integrity of a PW/encryption key means impossibility/possibility of tampering, that is, even when others steal the PW/encryption key, it is impossible for the others to reproduce or use the PW/encryption key in terms of device. Further, the reproducibility of a PW/encryption key means that it is easy only for a user to store and memorize the PW/encryption key and thus to reproduce the PW/encryption key.

In this specification, a processor means computer software or hardware that performs a specific means or function.

In this specification, a "touch" is used as a term collectively referring to gestures of using a "finger," a "pen," and the like for an input of a user on a display of a smart phone and gestures of making an input on a display of a desktop personal computer (PC) or the like with a "finger," a "pen," and a "mouse."

FIGS. 1(a) and 1(b) are a set of example diagrams of a network model in which a user authentication and signature device according to an embodiment of the present invention is implemented.

FIGS. 1(a) and 1(b) schematically show a user authentication and signature device having user authentication and signature functions together and a service environment in which the user authentication and signature device is used according to an embodiment of the present invention.

Referring to FIG. 1(a), the user authentication and signature device is provided and used in the environment of user information devices 101, 102, and 103 that have a touch display, an application providing server 105 that provides a certain service, and a network 104 that connects the user information devices 101, 102, and 103 and the application providing server 105.

For example, the user information devices 101, 102, and 103 may be a computing device, such as a smart phone, a tablet, and a PC, including a touch display, a central processing unit (CPU), a memory device, a network interface, and the like.

Also, the application providing server 105 may include a user database 106 for registering and managing application service users, and the users' IDs, PWs, etc. generated by the users may be stored in the user database 106.

FIG. 1(b) shows a peer to peer (P2P) network environment in which the user authentication and signature device of the present invention is provided and used according to an embodiment. Referring to FIG. 1(b), user information devices 107, 108, 109, and 110 are each provided at nodes in a P2P network 111, and the user authentication and signature device of the present invention may be provided in an embedded manner in each user information device.

In addition, the user authentication and signature device of the present invention may be provided and used in a wireless link network or the network of a hybrid web application like applications in Apple or Google store or the like and may also be provided in a closed private network only including specific application users.

As used below, a user information device refers to the user information device 101 among the various types of user information devices 101, 102, 103, 107, 108, 109, and 110 shown in FIGS. 1(a) and 1(b), and the remaining user information devices 102, 103, 107, 108, 109, and 110 may have the same function as the user information device 101.

FIGS. 2(a)-2(d) are a set of example diagrams illustrating the processing of a user's biometrics.

Specifically, FIGS. 2(a)-2(d) show an embodiment processed by a user biometric recognition processor provided in the user information device 101 through a user biometrics acquisition device installed in the user information device 101.

Referring to FIG. 2(a), a user's fingerprint is scanned using a fingerprint recognition device 201 installed in the user information device 101. Referring to FIG. 2(b), subsequently, biometrics 203 of the user is extracted according to feature points 202 of the fingerprint, stored in the user device, and used for user fingerprint recognition. Referring to FIG. 2(b), the biometrics 203 of the user is an example of numerical data of one fingerprint feature point 202 acquired in units of bits.

Referring to FIG. 2(c), in general, the user's biometrics, such as an iris, a face, and a blood vessel, is acquired through a camera 204 installed in the user information device 101. Referring to FIG. 2(d), the user's voice data is acquired using a microphone 205, and a processor in which a pattern matching algorithm for recognition is implemented is also installed and provided.

Accordingly, in the present invention, acquisition of a user's biometrics and a recognition processor of the acquired user biometrics employ a device and program installed and provided in the user information device 101 without change.

Before a user authentication and signature device and method are provided, it is necessary to have a processor that may acquire a user's biometrics and perform a process such as user biometric recognition. In this regard, in this specification, a process of acquiring a user's biometrics from the user using a biometrics input/output device and storing and recognizing the acquired biometrics of the user in an information device of the user is referred to as the user biometric recognition processor. In this specification, it is assumed that the user biometric recognition processor based on the user's biometrics is installed in a user information device in advance. Since the user biometric recognition processor employs well-known technology of a third party, detailed description thereof will be omitted.

Figure 3:
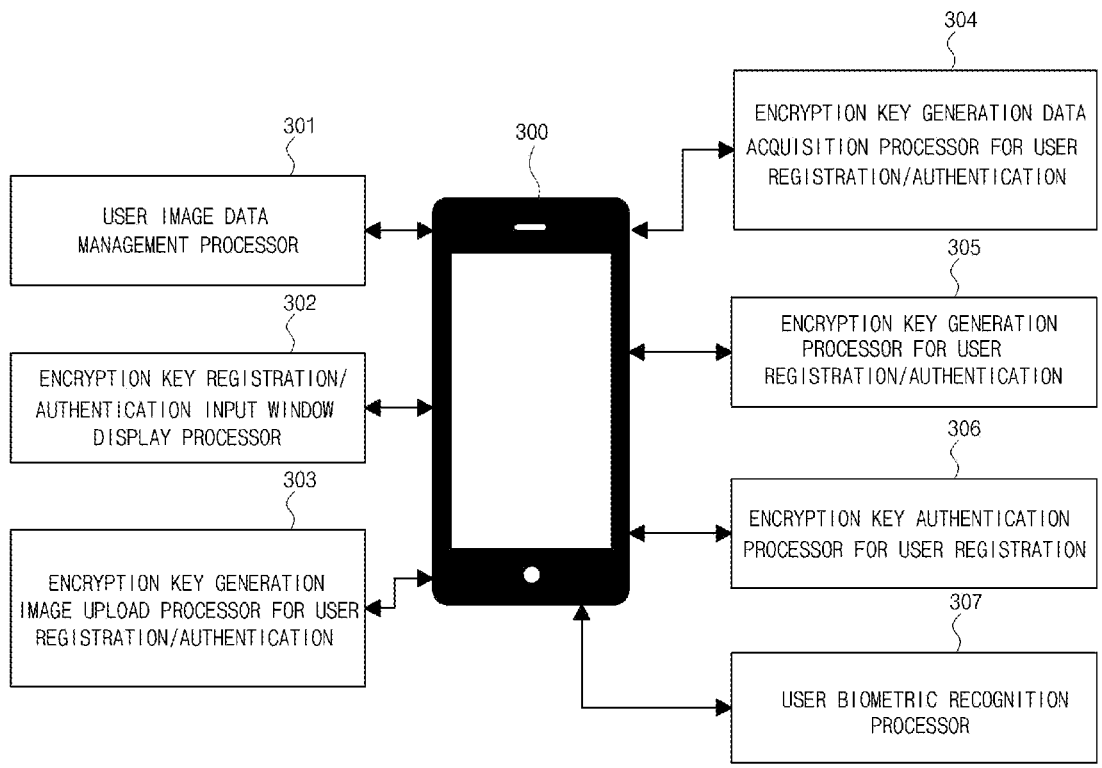
FIG. 3 is an example diagram of a user authentication and signature device according to an embodiment of the present invention.

FIG. 3 is an example diagram of a user authentication and signature device according to an embodiment of the present invention.

Referring to FIG. 3, the user authentication and signature method includes a user information device 300, a user image data management processor 301, an encryption key registration/authentication input window display processor 302, an encryption key generation image upload processor for user registration/authentication 303, an encryption key generation data acquisition processor for user registration/authentication 304, an encryption key generation processor for user registration/authentication 305, an encryption key authentication processor for user registration/authentication 306, and a user biometric recognition processor 307.

The user information device 300 includes a touch display and a computing function. Specifically, the user information device 300 may be a computing device, such as a smart phone, a tablet, and a PC, including a touch display, a CPU, a memory device, a network interface, and the like.

The user image data management processor 301 stores and manages specific image data to be displayed on the touch display of the user information device 300 in the user information device 300.

The encryption key registration/authentication input window display processor 302 may be an encryption key registration window display processor or an encryption key authentication input window display processor and requests user encryption key registration/authentication on the touch display of the user information device 300.

The encryption key generation image upload processor for user registration/authentication 303 may be an encryption key generation image upload processor for user registration or an encryption key generation image upload processor for user authentication and displays image data selected by the user or the user image data management processor 301 from among pieces of image data stored in an image storage device of the user information device on the touch display of the user information device 300 by uploading the selected image data in response to a user encryption key registration request or a user encryption key authentication request.

The encryption key generation data acquisition processor for user registration/authentication 304 may be an encryption key generation data acquisition processor for user registration or an encryption key generation data acquisition processor for user authentication and acquires encryption key data for user registration/authentication when the user designates a specific position pixel in the image data displayed on the touch display of the user information device 300 by the encryption key image upload processor for user registration/authentication 303 by touching the specific position pixel.

The encryption key generation processor for user registration/authentication 305 may be an encryption key generation processor for user registration or an encryption key generation processor for user authentication and generates an encryption key for user registration or an encryption key for user authentication by encrypting the user's biometrics, which is acquired from the user using a biometrics input/output device and stored in an information device memory of the user, or encryption generation data for user registration or encryption key generation data for user authentication which is acquired by the encryption key generation data acquisition processor for user registration/authentication 304.

The user biometric recognition processor 307 acquires the user's biometrics from the user using the user' biometrics input/output device provided in the user information device 300, stores the acquired biometrics of the user in the information device memory of the user, and then recognizes the user on the basis of the stored biometrics of the user.

For example, the user biometric recognition processor 307 may be provided in the user information device 300 and may acquire the biometrics 203 of the user shown in FIGS. 2(a)-2(d) using the user biometrics input/output devices 204 and 205 shown in FIGS. 2(a)-2(d) and then store the acquired biometrics in a user biometric recognition processor 307 installed in the user information device 300.

Figure 4:
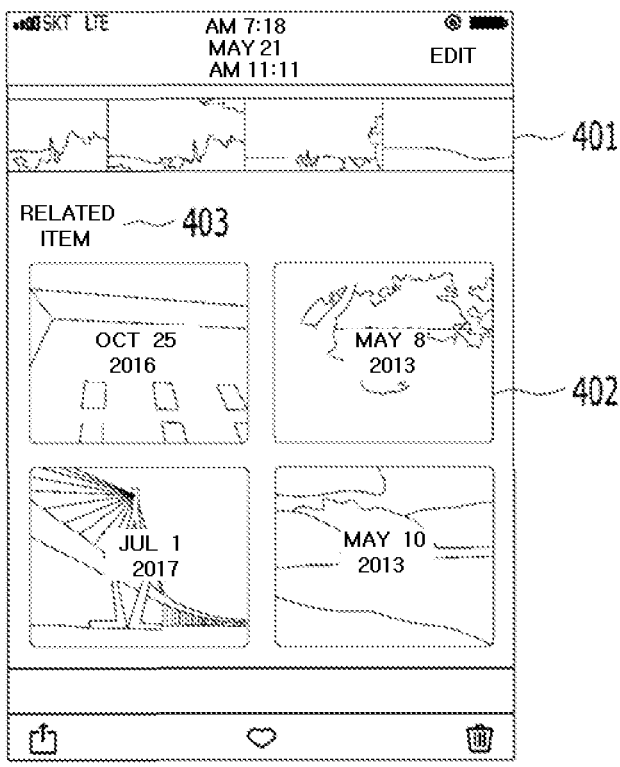
FIG. 4 illustrates an embodiment of a user image data management processor according to an embodiment of the present invention.

FIG. 4 illustrates an embodiment of a user image data management processor according to an embodiment of the present invention.

Specifically, FIG. 4 is an example of pieces of image data 401 and 402 stored in the memory device of the user information device 300. In each of the pieces of image data 401 and 402, a storage date, explanatory text, and digital data of an image are stored in units of pixels, and the pieces of image data 401 and 402 are configured as file devices.

A storage date 403, explanatory text, etc. attached to each of the pieces of image data 401 and 402 may be used as associative storage media for remembering what kind of image data has been used when a user registers himself or herself and generates user authentication and encryption keys to create an encryption key, Also, the user information device 300 may have a function in which the user image data management processor 301 recognizes whether an encryption key is for user registration required by a specific application, automatically selects an appropriate image with reference to the date of creation or explanatory text, and uploads the selected image to the touch display of the user information device 300.

For example, the user image data management processor 301 may be provided as a system program so that, when an encryption key is for registration on a specific date, an image related to the specific date may be selected or when an encryption key is related to a specific person, an image of the specific person may be selected. Also, the user image data management processor 301 may include an interface that enables the user to personally select desired image data in an image file device.

Figure 5:
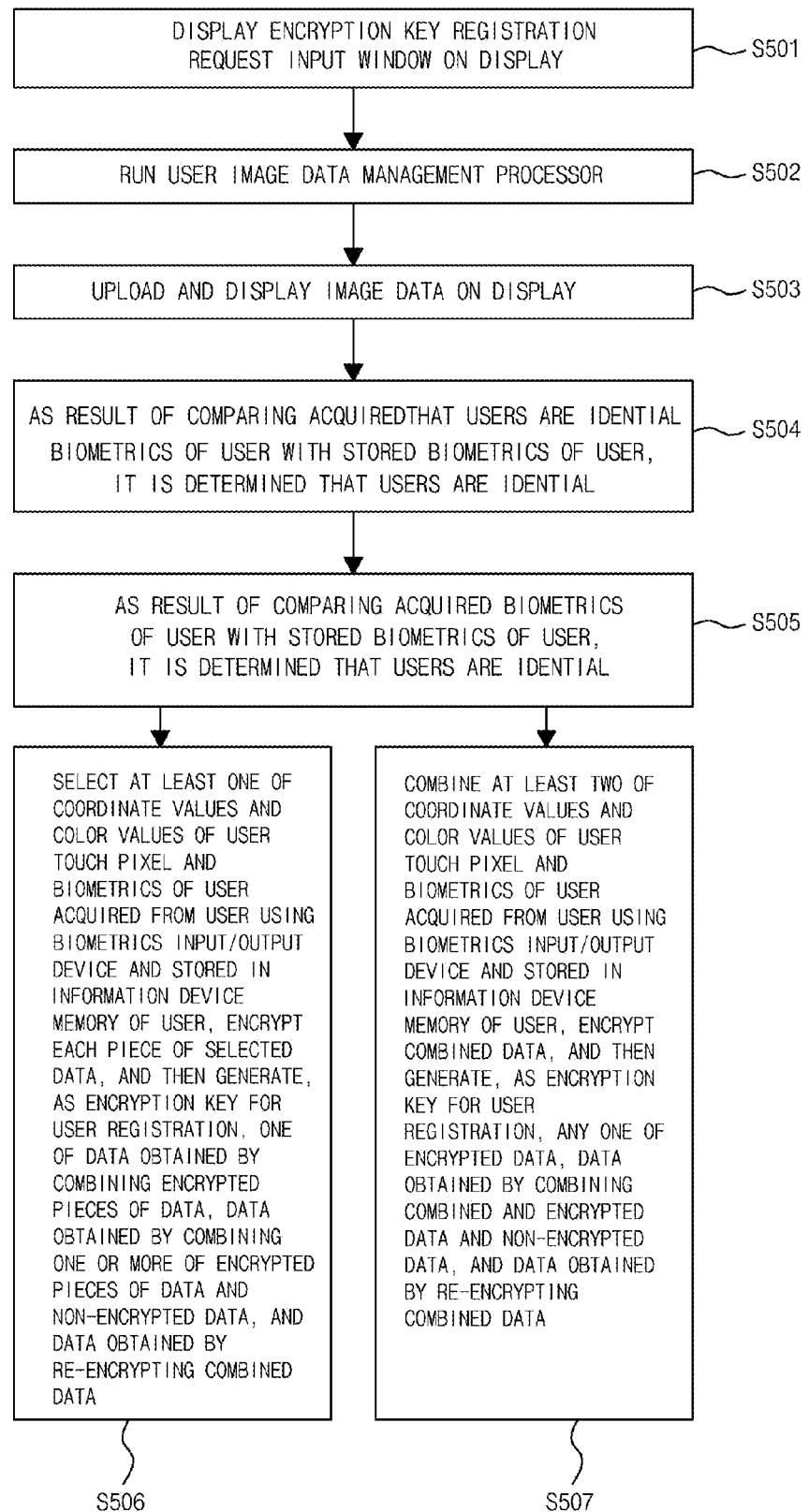
FIG. 5 is a flowchart illustrating a process of registering a user's encryption key by a user authentication and signature device according to an embodiment of the present invention.

FIG. 5 is a flowchart illustrating a process of registering a user's encryption key by a user authentication and signature device according to an embodiment of the present invention.

Each embodiment of processors and details of step-by-step processing of the present invention will be described below with reference to FIG. 5.

Referring to FIG. 5, when a user encryption key (PW) setting and registration request is displayed on the display of the user information device 300 (S501), the user image data management processor 301 opens an image data storage file of the user information device 300 in response to the encryption key setting and registration request (S502). Subsequently, the user image data management processor 301 displays stored pieces of image data on the touch display of the user information device 300 by uploading the pieces of image data to the touch display (S503) such that a user selects a desired piece of image data. Alternatively, the user image data management processor 301 may automatically select an appropriate piece of image data for an application requesting user encryption key registration and display the selected piece of image data on the touch display.

Accordingly, a processor having the two functions described above may be included in the user information device 300, and the function of any one processor may be provided. A means for the automatic selection may be provided as a program to automatically select an image according to information of an application requesting a PW as described above.

Subsequently, biometrics acquired and stored by the user biometric recognition processor 307 is compared with the user's biometrics again, and when the acquired and stored biometrics are identical to the user's biometrics (S504), the encryption key generation data acquisition processor for user registration/authentication 304 acquires coordinate values and color values of a specific touch pixel in a specific image designated and displayed to generate an encryption key for user registration (S505), and an encryption key is generated by the encryption key generation processor for user registration/authentication 305 (S506 and S507).

Specifically, the encryption key generation processor for user registration/authentication 305 (a) selects at least one of coordinate values 801 of the touch pixel, color values 802 of the touch pixel, and the biometrics 203 of the user acquired from the user using the biometrics input/output device and stored in the information device memory of the user, encrypts each piece of the selected data, and generates, as the encryption key for user registration, any one of data obtained by combining the encrypted pieces of data, data obtained by combining one or more of the encrypted pieces of data and the non-encrypted data, and data obtained by re-encrypting the combined data (S506) or (b) combines at least two of the coordinate values 801 of the touch pixel, the color values 802 of the touch pixel, and the biometrics 203 of the user acquired from the user using the biometrics input/output device and stored in the information device memory of the user, encrypts the combined data, and then generates, as the encryption key for user registration, any one of the encrypted data, data obtained by combining the combined and encrypted data and the non-encrypted data, and data obtained by re-encrypting the combined data (S507).

Figure 6:
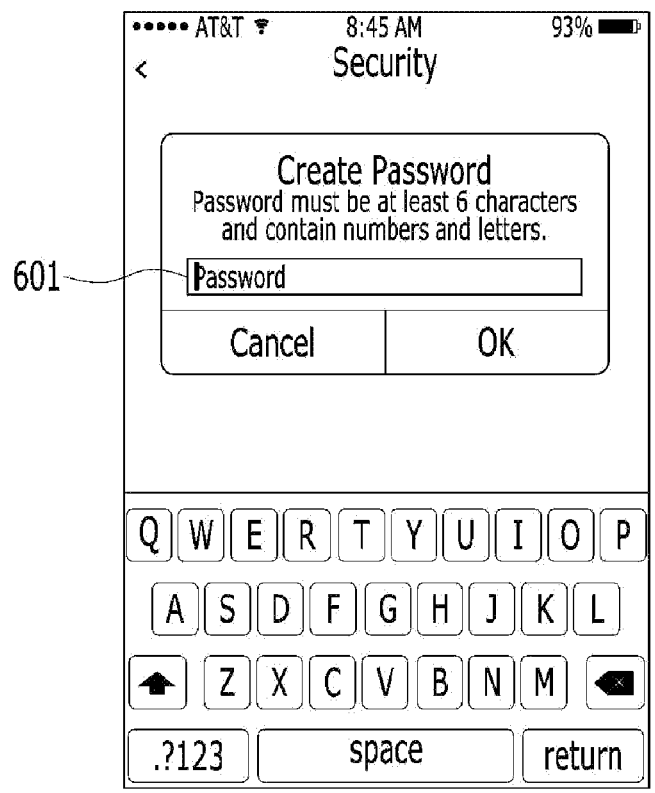
FIG. 6 is an example diagram of an encryption key input window which requires registration of a user encryption key in a specific application.

FIG. 6 is an example diagram of an encryption key input window which requests registration of a user encryption key in a specific application.

Referring to FIG. 6, in a specific application service, a service provider may show an encryption key input window for registration 601 that requests user encryption key registration on a touch display of a user information device while requesting a user to register his or her PW.

Figure 7:
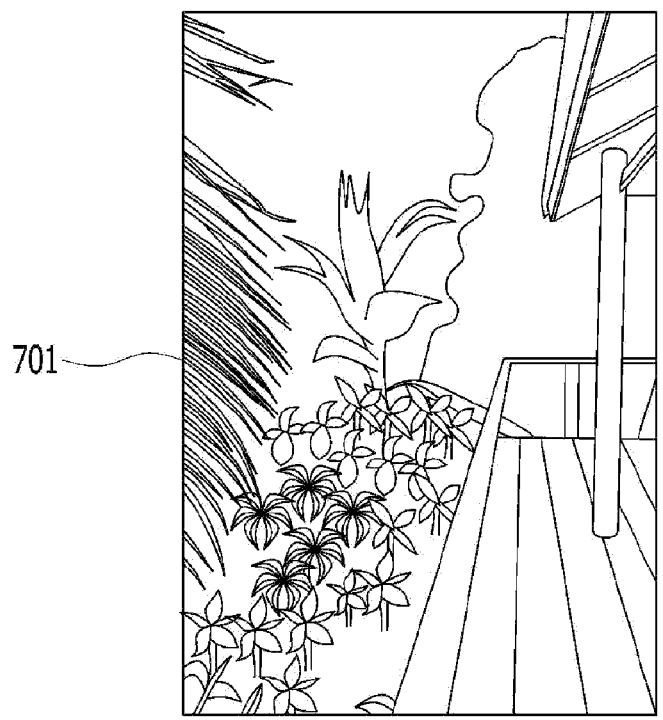
FIG. 7 illustrates an embodiment of uploading a user's image to a touch display in response to a user encryption key registration request.

FIG. 7 illustrates an embodiment of uploading a user's image to a touch display in response to a user encryption key registration request.

Referring to FIG. 7, when the user touches the encryption key input window for registration 601 in response to the user encryption key registration request of FIG. 6, the user image data management processor 301 displays the pieces of image data 401 and 402 shown in FIG. 4 by uploading the pieces of image data 401 and 402 from an image storage file to the display of the user information device 300. When the user selects a specific piece of image data 701 from among the displayed images, the selected piece of image data 701 may be displayed.

Figures 8, 9:
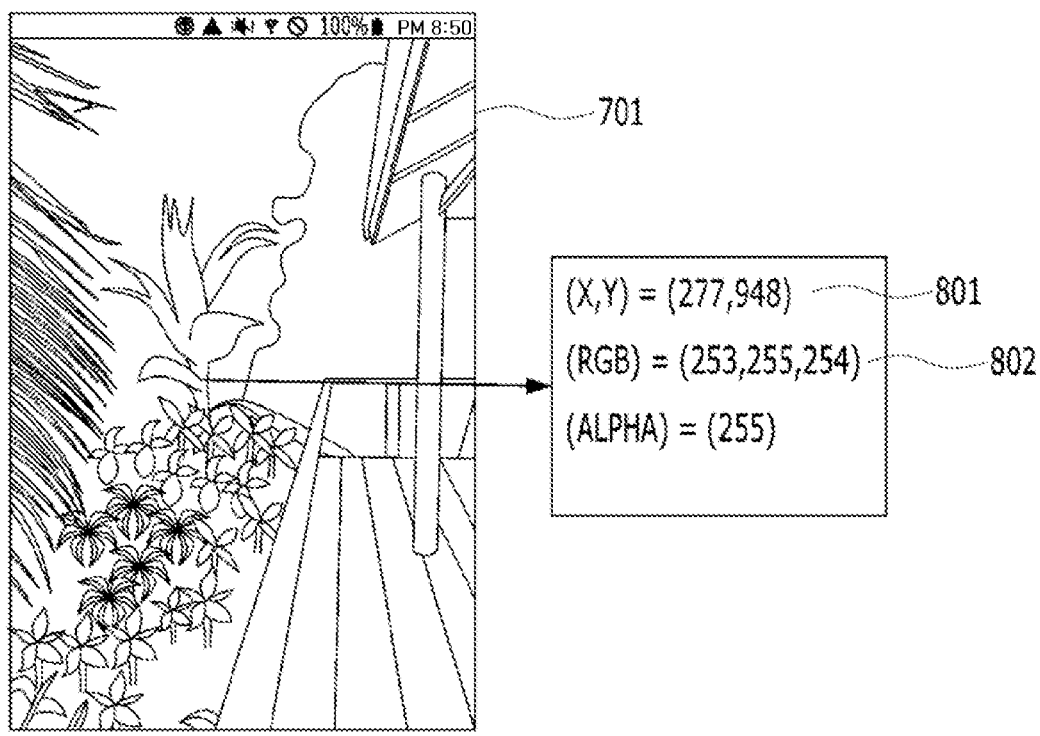
FIG. 8 is a diagram illustrating an embodiment of acquiring the data of a touch pixel from an image.
FIG. 9 is an example diagram of a password (PW) input request window for user authentication displayed on a display of a user to authenticate the user.

FIG. 8 is a diagram illustrating an embodiment of acquiring the data of a touch pixel from an image.

Specifically, FIG. 8 shows processing of pieces of pixel data 801 and 802 of the user acquired from the image data 701 when the user designates a specific point on the image data 701 displayed on the display of the user information device 300 by touching the specific point.

Referring to FIG. 8, as soon as the user touches the specific point, the user biometric recognition processor 307 for inputting the biometrics 203 of the user stored in the user information device 300 of the user again and verifying whether the users are identical to each other is run.

When the user biometric recognition processor 307 determines that the users are identical to each other as a pattern matching recognition result, the encryption key data acquisition processor for user registration/authentication 304 acquires coordinate values (X, Y) 801 of the touch pixel and color values (red green blue (RGB)) 802 of the touch pixel. Meanwhile, authentication of the user biometrics and acquisition of the user's touch pixel data may be simultaneously performed. In this case, a user information device capable of fingerprint recognition on the front side of the display may provide an optimal solution.

When the device of the present invention is installed in a user information device, for example, a smart phone having a sensor display function for recognizing a user's fingerprint, such as Samsung's Galaxy 10, it is possible to provide an optimal solution for the development of an application requiring user authentication and signature.

Referring back to FIG. 8, the image data 701 shown in FIG. 8 is displayed on the touch display of Samsung's Galaxy Note3 (1080×1920), and FIG. 8 is an example in which, with regard to the point touched by the user on the image data 701, the touch pixel has the coordinate values 801 of (277, 948) and the color values 802 of (253, 255, 254).

Meanwhile, a tool for acquiring the data of the user's touch pixel on the image data as described above may be readily implemented and processed because application program interfaces (APIs) are known, or the data of the user's touch pixel may be easily acquired by calculating X and Y coordinate values of the touch area. In the case of authentication also, a tool for acquiring the data values of a touch pixel may be easily implemented.

User data acquired as described above is stored in the memory device of the user information device 300. The data to be stored may be encrypted using a one-way hash function or encryption program and then stored or may be compressed using a biometrics compression program and then stored.

Next, an embodiment will be described regarding the encryption key generation processor for user registration 305 that generates an encryption key for user registration or an encryption key for user authentication by encrypting the coordinate values 801 and the color values 802 of the touch pixel or the user's biometrics 203.

An embodiment of encrypting the coordinate values 801 of the touch pixel and the color values 802 of the touch pixel or the user's biometrics 203 using a one-way hash function will be described below.

Specifically, the encryption key generation processor for user registration 305 (a) selects at least one of the coordinate values 801 of the touch pixel, the color values 802 of the touch pixel, and the user's biometrics 203, which is acquired from the user using the biometrics input/output device and stored in the information device memory of the user, encrypts each piece of the selected data, and generates, as the encryption key for user registration, any one of data obtained by combining the encrypted pieces of data, data obtained by combining one or more of the encrypted pieces of data and the non-encrypted data, and data obtained by re-encrypting the combined data or (b) combines at least two of the coordinate values of 801 the touch pixel, the color values 802 of the touch pixel, and the user's biometrics 203, which is acquired from the user using the biometrics input/output device and stored in the information device memory of the user, encrypts the combined data, and then generates, as the encryption key for user registration, any one of the encrypted data, data obtained by combining the combined and encrypted data and the non-encrypted data, and data obtained by re-encrypting the combined data.

First, an embodiment of a hash value encryption key obtained by encrypting the coordinate values 801 of the touch pixel, the color values 802 of the touch pixel, and the user's biometrics 203 will be described.

Hash value encryption keys (secure hash algorithm (SHA256 and SHA512) for the coordinate values 801 of the touch pixel are obtained as follows.

"SHA256(X,Y)=SHA256(277948)= D1CDDBB8DEE15A796E7E021A692C85D388 F0A3399CEBBO5F07484C3B2B3CCAE9" (1)

"SHA512(X,Y)=SHA512(277948)= 2C7DA404B69B2382D1B5806017FAACE19C9 F7439296AD359B7FCD61691EB64BC2B19D1807132D6 CE712850AF6138182D2DE58C 0EC550F401D563C21F54B1FAA9"

Also, hash value encryption keys (SHA256 and SHA512) for the color values 802 of the touch pixel are obtained as follows.

"SHA256(RGB)=SHA256(253255254)= 2314FA02267DC6CE8F5662A0DCFB0151 D03B43CC93319770A4824AD15C67F348" (2)

"SHA512(RGB)=SHA512(253255254)= 7AE223525E3F3E5403639FB0E4DEA9487 DCB63C75F51FC40E80BA97B6870791B70956B14470D F659822BBC50416278928FEA9 8B9DA73388E85B76CE811A5CDB7"

Also, hash value encryption keys (SHA256 and SHA512) for the user's biometrics 203 are obtained as follows.

"SHA25 6(finger print)= 4E418BF3D461CA0B4C49A0514ED7942A0E893D759D E369C89CF74BDD1D077 B0A" (3)

"SHA512(finger print) A871544968DABC2 D39005BB4CFF5FD0808D5C948292505CCFC3E624F72 21108900D4 9BAA8349E7F8DF1A4D1890AC5ADCE B6E45679F281D717046E27CF7BD8AAB"

Encryption keys (SHA256 and SHA512) are obtained by combining the three hash value encryption keys (1), (2), and (3) and hashing the combined data again as follows.

"SHA256((1)(2)(3))= A81194F8D9E9E61E3 5E14C4F9D175AB527D15E66388CBD D7C808553F31D1BD6C"

"SHA512((1)(2)(3))= 3A662BABE41EF25BDC3D69D0240 A6C4D624A6C7301289 AAEE7C09FB6F17B5125 847F9E76F200BA8F16D84D5D019E6F8BCE664F2FA4F F67850 294C7FD423332D0"

The encryption key generation processor for user registration 305 may determine the hash value encryption key (SHA256((1),(2),(3))), the hash value encryption key (SHA512((1),(2),(3))), or any one of the encryption keys (SHA256 and SHA512) as an encryption key for user registration, and the generated hash value encryption key is obtained through two encryption operations and thus is highly secure.

Second, an embodiment of a hash value encryption key obtained by combining a hash value encryption key, which is obtained by combining the coordinate values 801 of the touch pixel at a touch point of the user and the color values 802 of the touch pixel and then encrypting the combined data using a one-way hash function, with the user's biometrics 203 and encrypting the combined data using a one-way hash function will be described.

Hash value encryption keys (SHA256(4) and SHA512(5)) are obtained by combining the coordinate values 801 of the touch pixel and the color values 802 of the touch pixel and then encrypting the combined data using a one-way hash function as follows.

"SHA256(XYRGB)=E81FEC84259FD0D63166D C12141AA2E91B23FE573FD0F7 57907DA9810A44BB5B" (4)

"SHA512(XYRGB)=750CD6979C15E5819507 F9B03ED491237BE8C4160D6C2B5 6E960CB81E9A26B6C14668FB27DB919D92F9COD5DB CCA3A0EE5FA5CC84C449862 DA191B9CACDSDB6F" (5)

Also, hash value encryption keys (SHA256(6) and SHA512(7)) are obtained by combining the encryption key with the stored biometrics of the user again and encrypting the combined data using a one-way hash function as follows.

"SHA256(XYRGB)(BIO)=F12055FD338D0D F679A1C3042272F9F36CD4FCAEA EC012E09AEE69A582C804F0" (6)

"SHA512(XYRGB)(BIO)=9C9C8285F966486C3 E8890B459885F3DC0147E0B0A2 4A1F894CF5BE5A04121E7C6A4AF1ADD67A9B1893C7 81FE5CFE4416DBD92A72EBD 470D162618B3CF8F5C89" (7)

The encryption key generation processor for user registration 305 may determine the hash value encryption key (SHA256(XYRGB)(BIO)), the hash value encryption key (SHA512(XYRGB)(BIO)), or any one of the hash value encryption keys (SHA256(6) and SHA512(7)) as an encryption key for user registration.

Third, an embodiment of hash value encryption keys (SHA256 and SHA512) obtained by combining the coordinate values 801 of the touch pixel of the user, the color values 802 of the touch pixel, and the user's biometrics 203 and then encrypting the combined data using a one-way hash function will be described.

The hash value encryption keys (SHA256 and SHA512) are obtained by combining the coordinate values 801 of the touch pixel, the color values 802 of the touch pixel, and the user's biometrics 203 and then encrypting the combined data using a one-way hash function as follows.

"SHA256(XYRGBBIO)=318905E1D4A463696BAC D9AF8CD3132E4DEB4EC41C 82E3950DA851DEC4DCC6C4"

"SHA512(XYRGBBIO)=9EF8627D42245B214ACE6 2E586DEFFCF2F8C9F3C767 3DVCCOB1OBF77D016549B030C7189AC14FEOAF330 26DCOC1144ABD6480AC503CC6 4053A381BA43E1CA87A"

The encryption key generation processor for user registration 305 may determine the hash value encryption key (SHA256(XYRGBBIO)), the hash value encryption key (SHA512(XYRGBBIO)), or any one of the hash value encryption keys (SHA256 and SHA512) as an encryption key for user registration.

Next, an embodiment of public key encryption using a value, which is obtained by combining the coordinate values 801 of the touch pixel, the color values 802 of the touch pixel, and the user's biometrics 203 and hashing the combined data, as a secret key on the basis of an elliptic curve equation will be described.

Elliptic curve encryption is a public key encryption technique, and public key cryptography employs a pair of a public key and a secret key. The secret key (private key) is a unique key possessed by a user alone, and the public key refers to a key generated (encrypted) using the secret key of the user or a key used for decrypting a message.

For example, Bitcoin employs an elliptic curve digital signature algorithm (ECDSA) which is a public key encryption technique for electronic signature. In the ECDSA, a public key is generated according to Equation 1.

$$K = k*G \quad \text{[Equation 1]}$$

In Equation 1, K is a public key, k is a secret key, and G is a generator point. As an elliptic curve, Bitcoin employs the secp256k1 curve proposed by the National Institute of Standards and Technology (NIST). In the case of the secp256k1 curve, n which is the order of G is as follows: "n=115792089237316195423570985008687907858375642 7907490438260516314151814 94337."

Meanwhile, in Equation 1, (x, y) values of the reference point G are as follows:
"Gx=55066263022277343669578718895168534326250 60 34537775941755001873603891 16729240," and
"Gy=32670510020758816978083085130507043184 47127 33806592432759389043357 5733 7482424."

Accordingly, each public key is calculated using the obtained encryption keys as secret keys of the user according to Equation 1 as follows:
"$K_1$=A0ED188C7B4415FD65DBA776475E71E5CFDEDF EA17399A0B11711A3980F6F17 E*G,"
"$K_2$=F12055FD338D0DF679A1C3042272F9F36CD4FCA EAEC012E09AEE69A582C804F 0*G,"
"$K_3$=318905E1D4A463696BACD9AF8CD3132E4DEB4E C41C82E3950DA851DEC4DCC 6C*G." These values are public keys each corresponding to the secret keys.

As seen from the above embodiments, an encryption key (a secret (private) key, a public key) (i.e., a hash value encryption key) may be generated by combining a user's acquired data and the user's biometrics in various ways. The present invention in which an encryption key is generated by combining coordinate values of a touch pixel, color values of the touch pixel, and a user's biometrics in various ways as in the above embodiments has an advantage of making it more difficult for a third party to infer how and in which combining method a generated encryption key has been generated, and as a result, the integrity of an encryption key is further improved.

Meanwhile, an embodiment of evaluating the integrity of encryption keys generated through the above embodiments (https://howsecureismypassword.net/) is as follows. In other words, as for all encryption keys obtained through the above embodiments, it takes 3 sesvigintillion years, that is, $10^{63}$ years, to decrypt encryption keys based on SHA256 using a computer, and it takes 12,751,349,217,300,716,000,000, 000,000 quinquagintillion years, that is, $10^{153}$ years, to decrypt encryption keys based on SHA512. Accordingly, it is possible to theoretically guarantee the integrity of an encryption key according to the present invention.

An embodiment of the encryption key authentication processor for user registration 306 which is another function in the user authentication and signature device of the present invention will be described below.

FIG. 9 is an example diagram of a PW input request window for user authentication displayed on a display of a user to authenticate the user.

Referring to FIG. 9, to authenticate a user who has already been registered, the encryption key registration/authentication input window display processor 302 may display a user ID or PW input window 901 (i.e., an authentication encryption key input window) in response to a request of a general application.

Figure 10:
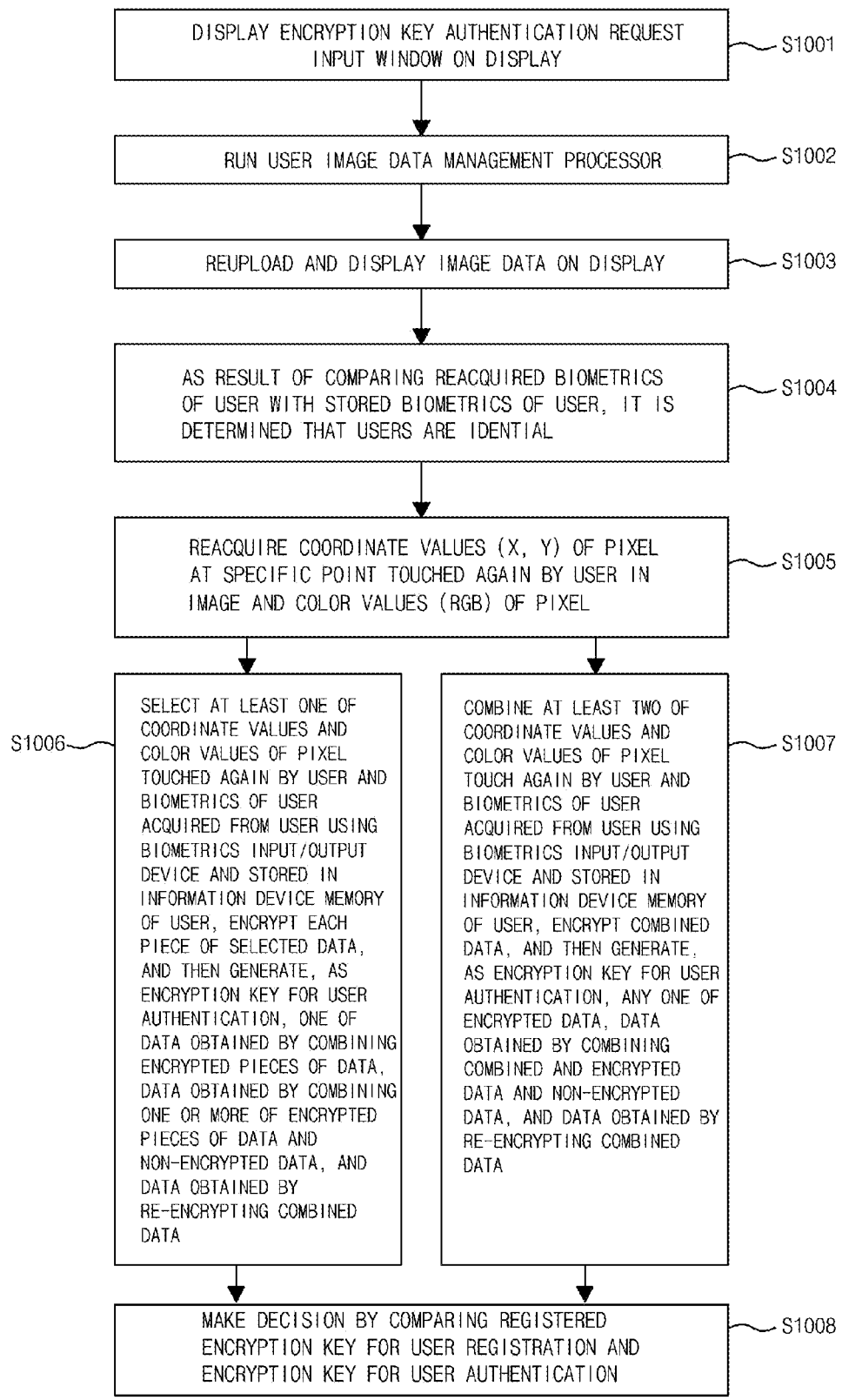
FIG. 10 is a flowchart illustrating a process for authenticating a user by a user authentication and signature device according to an embodiment of the present invention.

FIG. 10 is a flowchart illustrating a process for authenticating a user by a user authentication and signature device according to an embodiment of the present invention.

Specifically, FIG. 10 illustrates a process of the encryption key authentication processor for user registration 306 of the present invention.

Referring to FIG. 10, an authentication request input window for an encryption key is displayed on the display of the user information device 300 (S1001). When the user touches the PW input window 901 in response to the authentication request for a registered user encryption key, the user image data management processor 301 of the user information device 300 displays the same image data, which has been selected and displayed on the touch display by the user or the encryption key generation image upload processor for user registration/authentication 303 to be used for user encryption key generation, by uploading the image data from the storage device to the touch display (S1002 and S1003). In this case, when the user has generated and set the encryption key using the image data 701 shown in FIG. 7, the image data 701 shown in FIG. 7 is designated again by the user or displayed again on the display of the user information device 300 according to processing of the user image data management processor 301 and the encryption key generation image upload processor for user registration/authentication 303.

Meanwhile, in an operation in which the user remembers and touches the same point again as touched and designated by himself or herself for user encryption key registration on the same image data displayed again, the user needs to remember the touch point at which the encryption key has been registered. In this case, the number of user touches may be limited such that illegal use of the encryption key can be prevented.

Subsequently, as a result of comparing the user's reacquired biometrics with the stored biometrics of the user, it is confirmed that the users are identical to each other (S1004). When the user remembers and touches again the same point as touched and designated by himself or herself for user encryption key registration on the image data displayed again, coordinate values (X, Y) of the point touched again on the image by the user and color values (RGB) of the pixel touched again are acquired again (S1005).

In this case, any one of the following operations (a) and (b) having two different predefined functions is performed. Each operation is selected through the same processors 301, 302, 303, 304, 305, 306, and 307 as used by the user for encryption key registration, and encryption key generation data for authentication is acquired through operation (a) or operation (b).

Specifically, operation (a) of reacquiring the user's biometrics from the user using the biometrics input/output device, confirming that the users are identical to each other by comparing the user's reacquired biometrics with the user's biometrics already acquired and stored, and acquiring, when the user remembers and touches a pixel again at the same position as a pixel designated by a touch during user encryption key generation in the image data displayed again, coordinate values (X, Y) of the pixel touched again and color values (RGB) of the pixel touched again or operation (b) of reacquiring, when the user remembers and touches the same pixel again as designated by a touch during user encryption key registration in the image data displayed again, the user's biometrics and comparing the user's reacquired biometrics with the user's biometrics stored by the user biometric user recognition processor and simultaneously acquiring coordinate values (X, Y) of the pixel touched again and color values of (RGB) the pixel touched again (an operation of acquiring coordinate values of a pixel touched again and color values of the pixel touched again) is performed.

In this case, among operations (a) and (b), operation (b) is more preferable.

Meanwhile, a further detailed embodiment of generating an encryption key for user authentication is the same as exemplified in the encryption key for registration.

Specifically, the encryption key generation processor for user registration/authentication 305 (a) selects at least one of the coordinate values of the pixel touched again, the color values of the pixel touched again, and the user's biometrics acquired from the user using the biometrics input/output device and stored in the information device memory of the user, encrypts each piece of the selected data, and then generates, as an encryption key for user authentication, any one of data obtained by combining the encrypted pieces of data, data obtained by combining one or more of the encrypted pieces of data and the non-encrypted data, and data obtained by re-encrypting the combined data (S1006) or (b) combines at least two of the coordinate values of the pixel touched again, the color values of the pixel touched again, and the user's biometrics acquired from the user using the biometrics input/output device and stored in the information device memory of the user, encrypts the combined data, and then generates, as an encryption key for user authentication, any one of the encrypted data, data obtained by combining the combined and encrypted data and the non-encrypted data, and data obtained by re-encrypting the combined data (S1007).

The encryption key for user authentication generated as described above is automatically input to the PW input window for authentication 901 and then undergoes an encryption key authentication operation of making a decision by comparing the generated encryption key for user authentication with an encryption key for user registration previously registered in the user information device 300 or the device requesting user encryption key authentication (S1008). Each operation for encryption key authentication illustrated in FIG. 10 is performed by the encryption key authentication processor for user registration 306.

The process from registration of an encryption key to authentication of an encryption key is performed by a user's one or two touch operations on image data of the user, which is far more convenient than input of an existing PW such as a combination of letters.

Figure 11:
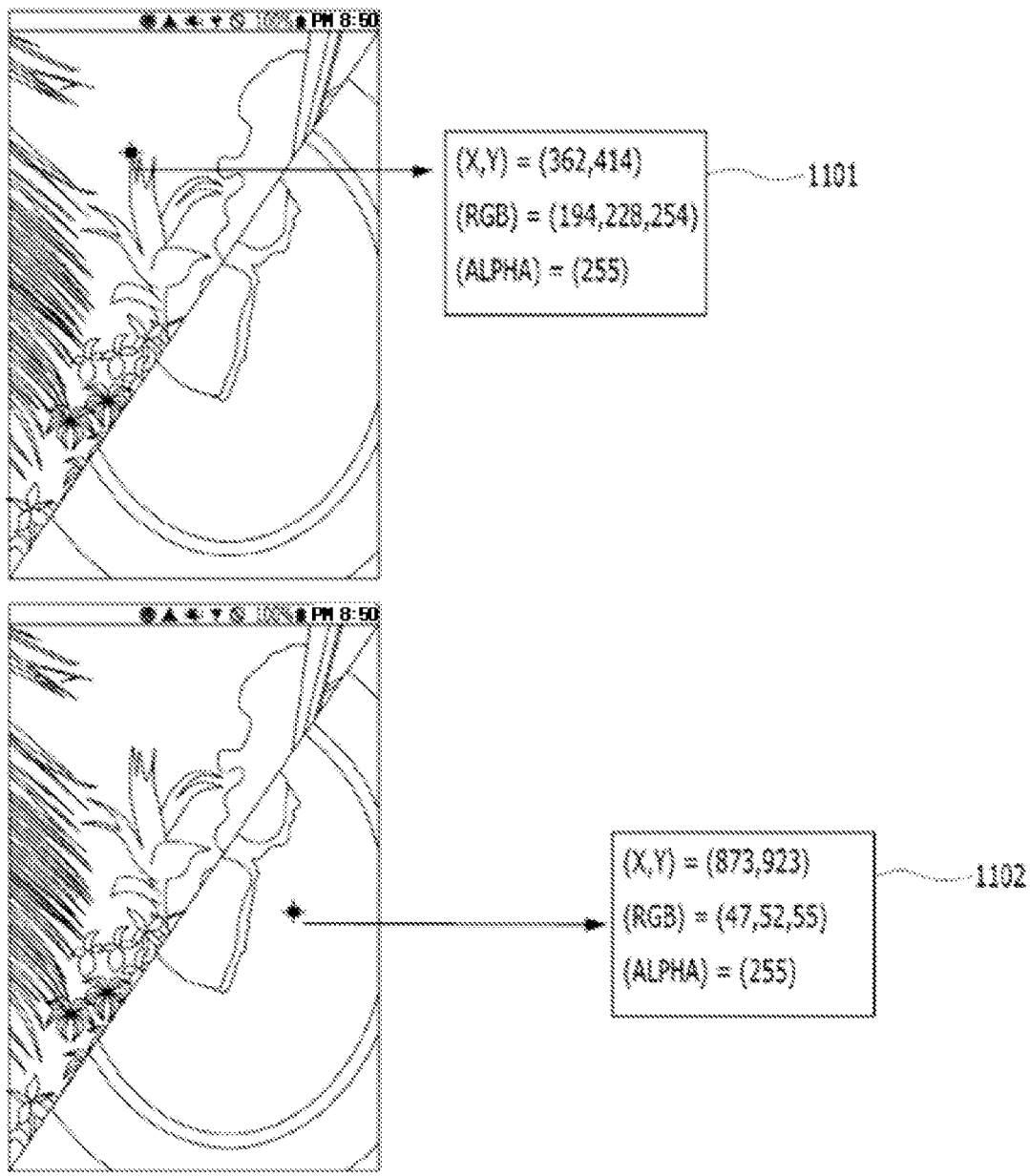
FIG. 11 illustrates examples of images which are displayed by a user authentication and signature device according to an embodiment of the present invention to register/authenticate a user encryption key using a plurality of images.

FIG. 11 illustrates examples of images which are displayed by a user authentication and signature device according to an embodiment of the present invention to register/authenticate a user encryption key using a plurality of images.

Specifically, FIG. 11 illustrates an embodiment of uploading and displaying a plurality of pieces of image data on the touch display of the user information device 300 and implementing the user authentication and signature device of the present invention using the plurality of pieces of image data.

Referring to FIG. 11, a plurality of images are displayed on the touch display of the user information device 300, and the user is allowed to designate a specific pixel on each of the images by touching the specific pixel such that an encryption key may be registered and authenticated. When an encryption key is registered on the basis of a plurality of specific touch pixels designated and selected by the user using a plurality of pieces of image data, it is possible to register an encryption key that is more confidential than an encryption key based on a specific touch pixel of the user in one image. An encryption key registration and authentication means and method in the device employing a plurality of pieces of image data are the same as the method described with reference to FIGS. 1 to 10. The encryption key registration and authentication means and method only require two identical processor runs.

Specifically, coordinate values and color values 1101 of a specific touch pixel may be acquired by selectively touching the specific touch pixel in a first image of the user. Various encryption keys (a first encryption key) may be generated and registered using the above-described processing methods of processors of the present invention on the basis of the acquired data and the user's biometrics 203. Subsequently, coordinate values and color values 1102 of a specific touch pixel may be acquired by touching a specific point in a second image and combined with the user's biometrics 203, and an encryption key (a second encryption key) may be generated using the encryption key generation processor for user registration of the present invention. After that, a third encryption key which is more secure may be generated and registered by combining the first encryption key and the second encryption key and using an encryption technique of the present invention again. Likewise, an encryption key for authentication may also be registered and authenticated in the same way by the same processor as described above.

The user authentication and signature device of the present invention can also be used as a multi-signature (group signature) device. In other words, the user authentication and signature device may be used in a service and the like requiring a group signature of several people. In the user information device 300 including the user authentication and signature device of the present invention, a configuration of a group signature device may be implemented in the same way as in the present invention. Also, the above-described technological configuration may also be applied to a technique for generating and registering a one time password (OTP) and the like without change.

Hereinafter, a user registration, authentication, and signature means and method based on the user authentication and signature device of the present invention will be evaluated in comparison with FIDO standard technology.

For user authentication and signature according to the FIDO standard, there is provided a user authentication and signature device that basically includes the user biometric recognition processor 307 based on the user's biometrics as in the present invention.

Figure 12:
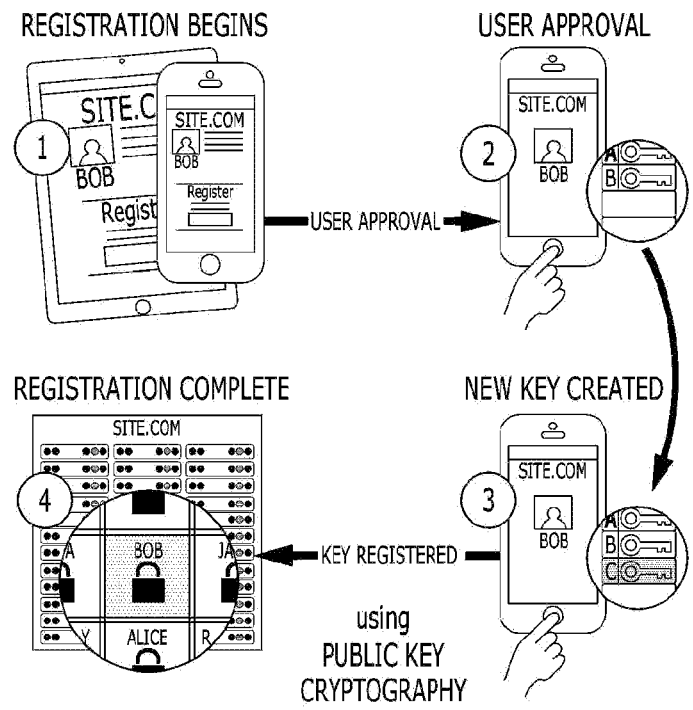
FIG. 12 is a set of diagrams illustrating a process flow for user registration according to a Fast IDentity Online (FIDO) standard method.
Figure 13:
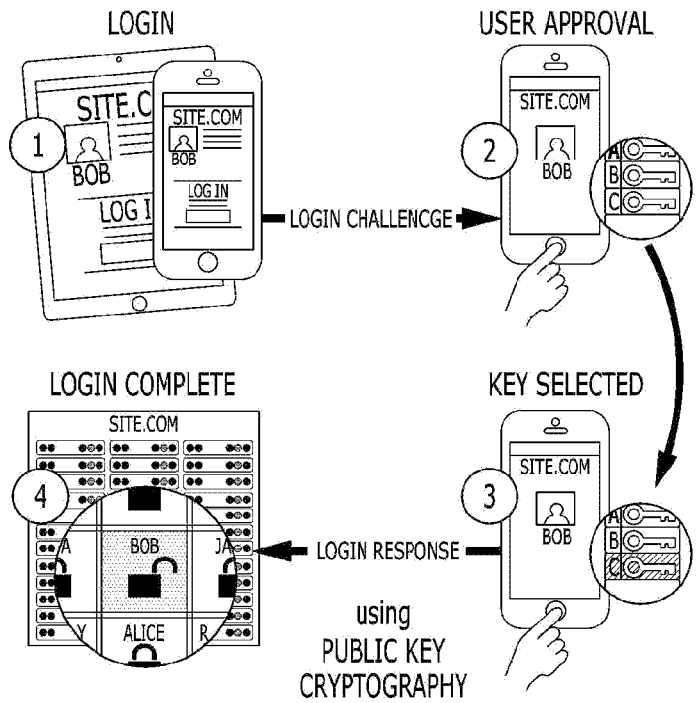
FIG. 13 is a set of diagrams illustrating a process flow for user authentication according to a FIDO standard method.

FIG. 12 is a set of diagrams illustrating a process flow for user registration according to a FIDO standard method, and FIG. 13 is a set of diagrams illustrating a process flow for user authentication according to a FIDO standard method.

Referring to FIG. 12, a FIDO process corresponding to encryption key registration of the present invention is referred to as "registration."

Specifically, registration is a process of registering an attestation (a signature value proving that a user's authentication information has been generated by a specific FIDO authentication device) of the user and a public key in a server. Registration will be described below with reference to FIG. 12.

①̂ When a user requests a server (a FIDO server) to register user information (an encryption key/PW), ②̂ the server requests authentication information from a user device (a FIDO client) and transmits a related policy, and ③̂ the user inputs his or her biometrics through a user recognition device, generates one pair of a private key and a public key using the input biometrics as an authenticator in the user device, and transmits the generated public key and an attestation to the server. ④̂ The server completes user registration by storing and managing the user's attestation and public key received from the user device.

During the FIDO registration process, ③̂ the user inputs biometrics through an authentication device, and in the operation of generating the single pair of the private key and the public key using the input biometrics as the authenticator, user authentication is performed on the basis of the user's biometrics. When the user authentication is successful, the private key and the public key are generated, and the user's attestation (a digital signature value proving that the user's authentication information has been generated by a specific FIDO authentication device) is generated with the private key. Accordingly, the user's biometrics serves to unlock and run a signature generator that generates a private key/public key.

The function is the same as a function of unlocking and running a processor that acquires touch data of a user touch point according to the present invention when user recognition is successfully performed on the basis of a user's biometrics. In other words, FIDO uses a successful user biometric recognition result to run a digital signature key generator that generates a private key/public key, and in the present invention, a user recognition result based on biometrics serves to run the data acquisition processor for user encryption key registration 304 for generating and registering an encryption key. The user authentication and signature device of the present invention and FIDO are the same in that a user recognition processor based on biometrics is used but are different in processing after user recognition. In other words, the user authentication and signature device of the present invention generates an encryption key using coordinate values of a touch pixel in a specific image of a user, pixel values thereof, or the user's biometrics, whereas FIDO generates a private key and a public key, which correspond to the standard digital signature method, and generates an attestation of a user using the private key.

Referring to FIG. 13, a FIDO process corresponding to a user authentication means and process of the present invention is referred to as login or transaction confirmation and is described as follows.

With regard to login or transaction confirmation, a process of receiving a digital signature for user authentication (login) or transaction content is as follows. ①̂ A user device requests a login/transaction confirmation from a server (a FIDO server). ②̂ The server generates a login challenge for verification and transmits the login challenge to the user device (a FIDO client). ③̂ The user extracts a private key stored in the terminal through registered biometric recognition information and digitally signs the login challenge (or original transaction data) received from the server, and the user device transmits the signed login challenge (or the original transaction data) to the server. ④̂ The server verifies whether the content of an attestation (a digital signature value proving that the user's authentication information has been generated by a specific FIDO authentication device) of the user received from the user device has been tampered with using a public key of the user.

As described above, authentication and signature systems of the present invention and FIDO are fundamentally different. In other words, the present invention does not additionally have a signature method, whereas FIDO employs a standard signature method.

According to the standard digital signature method employed by FIDO, after one pair of a public key (a verification key) and a private key (a signature key) are determined in a user device, encrypting a message with the private key corresponds to signature creation, and decrypting ciphertext with the public key corresponds to signature verification. The detailed process is shown in FIG. 14.

Figure 14:
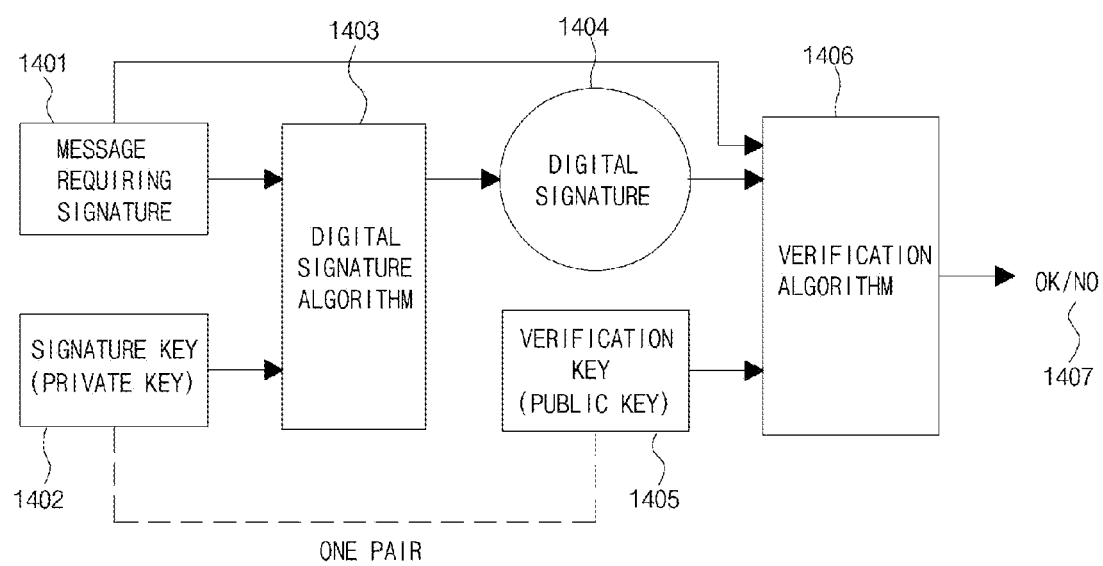
FIG. 14 is a flowchart illustrating the relationship among functions processed in a standard digital signature method.

FIG. 14 is a flowchart illustrating the relationship among functions processed in a standard digital signature method.

Referring to FIG. 14, a sender completes a digital signature 1404 by applying a digital signature algorithm 1403 to a message 1401 requiring a signature with a signature key (a private key) 1402 and then transmits the encrypted message to a receiver together with a public key 1405. The receiver decrypts the encrypted message with a verification algorithm 1406, that is, the public key, and verify whether the message has been tampered (1407).

There are various algorithms for implementing the digital signature creation and verification method. Representative algorithms are Ron Rivest, Adi Shamir, and Leonard Adleman (RSA), digital signature algorithm (DSA), ECDSA, Edward DSA (EdDSA), and the like.

A standard signature method may vary in validity depending on the integrity of a user's encryption key, that is, the possibility of tampering. In other words, a user may falsely claim that his or her encryption key (a private key or a public key) has been lost or stolen, or the user's key may be actually stolen. For this reason, a digital signature method involves the cost of public key infrastructure. Also, standard digital signature creation methods include directly signing a message and signing the hash value of a message. Since directly signing a message takes time for encryption, a method of calculating a hash value using a one-way hash function and encrypting the hash value with a private key is frequently used.

Meanwhile, in the present invention, a process corresponding to digital signature is performed by the encryption key generation processor for user registration 305 which generates the encryption key for user registration. In other words, the process is performed by encrypting a user's biometrics, which is acquired from the user using the biometrics input/output device and stored in an information device memory of the user, and encryption key data for user registration acquired by the data acquisition processor for user encryption key registration.

An attestation encrypted with a private key in FIDO corresponds to an encryption key generated by the user encryption key generation processor of the present invention. While the attestation of FIDO is obtained by hashing user information and then encrypting the hash value with the private key, the encryption key of the present invention is a hash value of data obtained by combining the user's touch data on a specific image and the user's biometrics. User information constituting the attestation of FIDO is the user's unspecified data, whereas data constituting the encryption key of the present invention includes three-element information for authentication which ensures confidentiality and safety.

The three elements for authentication refer to a user's knowledge information, ownership information, and bio-information. The user's knowledge information corresponds to an image specified by the user in the present invention, coordinates of a touch pixel specified on the image by the user, and color values of the touch pixel. The user's ownership information corresponds to the types of devices possessed by the user and an ownership image. The user's biometrics corresponds to stored biometrics of the user. The pieces of information are unique, vary depending on each user, and thus can be used as information for user authentication and signature. Accordingly, the pieces of information may be superior to the standard digital signature method based on a public key/private key pair.

This is because it is not possible to reproduce or copy the encryption key of the present invention including the three-element authentication information unless all the three pieces of authentication information are leaked. Accordingly, in principle, the encryption key of the present invention provides the digital signature function, that is, makes it possible to detect tampering of the encryption key (ciphertext) and nonrepudiation of a user, without a separate digital signature key generation device. In principle, any user cannot generate and register the encryption key of the present invention without the three-element authentication information. Therefore, authentication information indicating that the corresponding user is the owner of a user encryption key (ciphertext) is immanent in an encryption key generated according to the present invention such that the digital signature function, that is, user authenticity, is ensured.

As a result, the method of the present invention has high reproducibility of a safe PW without the burden of remembering a PW compared to the existing user authentication method based on a PW which is a string of letters, signs, and numerals and thus can be used with one encryption key in a plurality of different websites and application services. Also, unlike the signature method of the FIDO standard, it is possible to conveniently and easily provide an economic user authentication and signature device without a digital signature processor for generating a secret key and a public key of the digital signature method.

Next, the existing PW method and the method of the present invention are evaluated. What standard should be followed in the case of generating an encryption key is a well-known issue. In other words, general guidelines for generating a safe encryption key or PW are as follows: 1̂ using information that the user alone is aware of and 2̂ separately using a plurality of encryption keys/PWs and using an encryption key generation/management tool. 3̂ Using information that the user alone is aware of means that even when the encryption key is stolen by a third party, the third party cannot infer on what basis the encryption key has been generated, that is, it is difficult for a third party to estimate the source of the encryption key because the source of the encryption key has high randomness.

Main characteristics of the encryption key of the present invention are as follows: First, the encryption key is based on a personal image that a user has. Accordingly, it is difficult for a third party to infer from what image the encryption key has been generated, and the encryption key is far more superior to other methods in terms of randomness. Second, even when it is possible to infer the image, it is not easy to infer a specific point selected and designated in the image by the user himself or herself. The third characteristic is the user's biometrics. Even when it is possible to infer the encryption key is the user's biometrics, it is not easy to generate the user's biometrics. Since the encryption key is generated by combining three pieces of data that are difficult to infer as described above, the encryption key generation method of the present invention is safer than any encryption key generation method of the related art. When a third party tries to steal the user's encryption key, it is necessary to solve the three types of randomness, and thus the integrity of the encryption key can be ensured compared to other methods.

A plurality of encryption keys/PWs according to the related art put a heavy burden of remembering on the user in the case of separately using the plurality of encryption keys/PWs depending on use. According to the encryption key method of the related art, usually letters, numerals, signs, etc. may be combined to be relatively long and used. However, even when a plurality of encryption keys are set and used, there are many problems in the burden of remembering the encryption keys and a method of storing the encryption keys. On the other hand, according to the present invention, it is easy to generate and use a plurality of encryption keys in a safe and flexible manner depending on use. As described above, as long as an image and a specific touch pixel in the image are remembered, it is possible to use even a plurality of encryption keys according to the method of the present invention anytime, anywhere in various application services without the burden of remembering and secret storage.

Also, as described above, with an increase in the length of a source (or a seed) for generating an encryption key, the integrity of the encryption key is increased, but it becomes difficult to remember the encryption key, store and manage the encryption key, and the like. As described above, there is a trade-off relationship. In general, in an application for cryptocurrency and the like, the source of an encryption key is generated by a random number generator or in a hardware method for high security of the encryption key. An encryption key source generated by a random number generator, hardware, or the like as described above has little reproducibility. Accordingly, it is necessary to store and manage the encryption key source or encryption key in a hidden place in secret to verify the encryption key, and it is necessary to store and manage the encryption key source or encryption key such that the encryption key source or the encryption key is reproduced for encryption key verification. For this reason, in services for cryptocurrency and the like, various techniques are being proposed and developed to store and manage encryption keys. For example, as a technique for safely storing and managing an encryption key or a secret key, a paper wallet, a hardware wallet dedicated to encryption key storing, or the like is being provided. However, the method of storing and managing an encryption key on the basis of software, hardware, or a wallet is useless when the encryption key is stolen or lost. The reason is that there is no way of reproducing the set encryption key.

The method of storing and managing an encryption key according to the present invention is very safe and simple compared to the conventional method. The reasons are as follows: First, an image which is the source of an encryption key is stored and managed in an information device of a user. Accordingly, even when the image is stolen among many images, the image is useless for a third party. Second, even when the image is specified, the user's specific touch point information is encrypted and stored in a hidden memory device of the user information device, and thus it is difficult to acquire and reproduce the specific touch point information. Third, even when the two pieces of information, that is, the specific image and the data of the specific touch pixel, are acquired, generating and verifying the encryption key of the present invention is only allowed by verifying the user's biometrics. Accordingly, a third party cannot fundamentally generate the same encryption key. Fourth, the encryption key of the present invention is free from loss or theft. This is because the encryption key can be changed, replaced, and reproduced anytime, anywhere.

The length of an encryption key has a strong relationship with the source length of the encryption key. In general, data that is the source of an encryption key is also referred to as a secret key. An important aspect of the secret key is the concept of a key space. The key space means "the total number of possible keys" and refers to the total number of keys that may be generated with the secret key. The size of the key space is indicated by the number of bits of keys. For example, when the length of a secret key is $2^8$ bits, 256 secret keys can be generated. In general, the safe length of a secret key is known to be a maximum of "$2^{512}=1.340780*10^{154}$." A question of calculating a secret key in the maximum key space takes hundreds of years to solve even with existing supercomputers.

Meanwhile, the length of an encryption secret key (a source) corresponding to the secret key of the present invention is as follows.

In the present invention, data that is the source (corresponding to a secret key) of an encryption key is generated by combining coordinate values (X, Y) of a specific touch pixel selected in an image by a user and color values (RGB) of the pixel. Accordingly, the coordinate values (X, Y) of the single representative pixel vary depending on display resolution (size). The storage size of integral data in a computer varies from "$2^{16}$ to $2^{64}$" bits depending on the operating system (OS), and the color data of a pixel is "$2^{16}$" to $2^{32}$ bits such that the length of a PW generated from the user's single specific touch pixel is a minimum of $2^{32}$ to a maximum of $2^{98}$. Together with the combined data, the user's biometrics is added. The size of the user biometrics varies depending on type, but the biometrics shown in FIGS. 2(a)-2(d) is $2^{64}$ bits. Accordingly, when the biometrics is combined with the data of the coordinate values and the color values, the data size becomes a minimum of $2^{112}$ bits to a maximum of $2^{168}$ bits. In the present invention, the number of key spaces may be increased by increasing the number of images or the number of specific touch points of the user such that the integrity of a safe encryption key is made flexible. Also, it is possible to generate and manage a safe encryption key without installing a tool such as a random number generator.

A user biometric authentication device is provided in most current smart phones. A user bio-authentication device in a user device is merely used for a user recognition service in a closed environment, that is, the inside of the user information device. However, as for user biometrics of the present invention, even when the user biometrics is leaked to the outside, it is not possible to separate the user biometrics from other data because the user biometrics is combined with another authentication element and hashed. Even when the user biometrics is separated, it is fundamentally impossible to generate the same encryption key unless there are all three pieces of authentication data or there is a user recognition result online. Accordingly, the user authenticity of the encryption key can be ensured, and it is possible to avoid the risk of leakage of a user's personal information. Also, an economic user authentication and signature device service is available in various applications simultaneously in an open and stable manner.

According to the present invention, it is possible to provide a user authentication and signature device and method that are more convenient, safer, and more confidential than user authentication and signature devices and methods according to FIDO 1.0 and FIDO 2.0 specifications and protocols which are international standards.

Also, according to the present invention, it is possible to provide a user authentication and signature system based on three types of unique authentication information of a user. Specifically, with a user authentication and signature system based on a user's knowledge information, ownership information, and bio-information, it is possible to provide a user authentication and signature device of a new ecosystem which has no signature system unlike FIDO standards and protocols, in which user bio-information that is unique personal information of the user is at no risk of being illegally used even when being provided to a service device of a third party, and in which user bio-information can be safely used regardless of loss because the user bio-information is useless for third parties.

According to the present invention, as long as only an encryption key generation process is remembered, it is possible to safely provide an easy user authentication and signature method with one PW at all times in various devices and services in the same way without having to store an encryption key in another device or the like.

According to the present invention, it is possible to conveniently generate an encryption key of a user which is easily remembered and hidden using a specific photo/image of the user, and it is possible to provide an integrated user authentication and signature device which has excellent confidentiality, safety, and reproducibility in the Internet of things (IoT), cryptocurrency circulation, or application services for various uses using biometrics of the user as well.

According to the present invention, since it is unnecessary to provide a tool, such as a random number generator, to generate an encryption key (a private key/public key), it is possible to provide an economic user authentication and signature device.

According to the present invention, when a user's image/photo is added to the user's biometrics which is a user authenticator of an existing FIDO standard method and the combination is determined as a multimodal authenticator, it is possible to further increase the user's convenience. Also, when the multimodal authenticator is added to a public signature method which is the digital signature method of the current FIDO standard, it is possible to provide a strong user signature method without changing the FIDO standard.

Although the present invention has been described above with reference to specific details, such as specific components, and limited embodiments and drawings, these are provided to help overall understanding of the present invention, and the present invention is not limited to the above embodiments. Those skilled in the art to which the present invention pertains can make various modifications and alterations from the description. Therefore, the spirit of the present invention should not be determined by the described embodiments, and the claims, all equivalents to the claims, and equivalent modifications should be construed as falling within the scope of the spirit of the present invention.

The invention claimed is:

1. A user authentication and signature device comprising:
a user information device including a touch display and a computing function;
the user information device including a user biometric recognition processor configured to acquire biometrics of a user from the user using a user bio-input/output device provided in the user information device, store the biometrics in an information device memory of the user, and recognize the user on the basis of the acquired and stored biometrics of the user;
a user image data management processor configured to store and manage, in the user information device, specific image data to be displayed on the touch display of the user information device;
an encryption key registration window display processor configured to request user encryption key registration on the touch display of the user information device;
an encryption key generation image upload processor for user registration configured to display image data selected by the user or the user image data management processor from among pieces of image data stored in an image storage device of the user information device on the touch display of the user information device by uploading the selected image data in response to the user encryption key registration request;
an encryption key generation data acquisition processor for user registration configured to acquire encryption key generation data for user registration when the user designates a specific position pixel in the image data displayed on the touch display of the user information device by the encryption key generation image upload processor for user registration by touching the specific position pixel; and an encryption key generation processor for user registration configured to generate an encryption key for user registration by encrypting the biometrics of the user, which is acquired from the user through the biometrics input/output device and stored in the information device memory of the user, or the encryption key generation data for user registration acquired by the encryption key generation data acquisition processor for user registration, wherein the encryption key generation data acquisition processor for user registration, which acquires the encryption key generation data for user registration when the user designates the specific position pixel in the image data displayed on the touch display of the user information device by the encryption key generation image upload processor for user registration by touching the specific position pixel, comprises at least one of:

(a) the encryption key generation data acquisition processor for user registration configured to perform a user recognition process of reacquiring biometrics of the user from the user using the biometrics input/output device, confirming that users are identical to each other by comparing the reacquired biometrics of the user with the previously acquired and stored biometrics of the user, and then acquiring coordinate values of the touch pixel and color values of the touch pixel; and (b) the encryption key generation data acquisition processor for user registration configured to perform a user recognition process of reacquiring biometrics of the user from the user using the biometrics input/output device and confirming that the users are identical to each other by comparing the reacquired biometrics of the user with the previously acquired and stored biometrics of the user and simultaneously acquire coordinate values of the touch pixel and color values of the touch pixel.

2. The user authentication and signature device of claim 1, wherein the encryption key generation processor for user registration configured to generate the encryption key for user registration by encrypting the biometrics of the user, which is acquired from the user through the biometrics input/output device and stored in the information device memory of the user, or the encryption key generation data for user registration acquired by the encryption key generation data acquisition processor for user registration comprises one of:

(a) the encryption key generation processor for user registration configured to select at least one of the coordinate values of the touch pixel, the color values of the touch pixel, and the biometrics of the user acquired from the user using the biometrics input/output device and stored in the information device memory of the user, encrypt each piece of the selected values, and generate, as the encryption key for user registration, any one of data obtained by combining the encrypted pieces of data, data obtained by combining one or more of the encrypted pieces of data and a non-encrypted data, and data obtained by re-encrypting a combined data; and (b) the encryption key generation processor for user registration configured to combine at least two of the coordinate values of the touch pixel, the color values of the touch pixel, and the biometrics of the user acquired from the user using the biometrics input/output device and stored in the information device memory of the user, encrypt the combined data, and then generate, as the encryption key for user registration, any one of the encrypted data, data obtained by combining the combined and encrypted data and the non-encrypted data, and data obtained by re-encrypting the combined data.

3. The user authentication and signature device of claim 1, wherein the generating of the encryption key for user registration by encrypting the acquired coordinate values of the touch pixel, the acquired color values of the touch pixel, or the biometrics of the user comprises generating the encryption key for user registration by encrypting the acquired coordinate values of the touch pixel, the acquired color values of the touch pixel, or the biometrics of the user using a one-way hash function or an elliptic curve equation.

4. A user authentication and signature device comprising:
a user information device including a touch display and a computing function;
the user information device including a user biometric recognition processor configured to acquire biometrics of a user from the user using a user bio-input/output device provided in the user information device, store the biometrics in an information device memory of the user, and recognize the user on the basis of the acquired and stored biometrics of the user;
a user image data management processor configured to store and manage, in the user information device, specific image data to be displayed on the touch display of the user information device;
a processor configured to display an encryption key input window which requests user encryption key authentication on the touch display of the user information device;
an encryption key generation image upload processor for user authentication configured to display image data selected by the user or the user image data management processor from among pieces of image data stored in an image storage device of the user information device again on the touch display of the user information device by uploading the selected image data in response to the user encryption key authentication request;
an encryption key generation data acquisition processor for user authentication configured to acquire encryption key generation data for user authentication when the user remembers and touches a pixel again at the same position as the pixel designated by a touch during user encryption key registration in the image data;
an encryption key generation processor for user authentication configured to generate an encryption key for user authentication by encrypting the encryption key generation data for user authentication acquired by the encryption key generation data acquisition processor for user authentication; and
an encryption key authentication processor for user registration configured to make a decision by comparing the generated encryption key again by the encryption key generation processor for user authentication with an encryption key already stored in the user information device or a device requesting user encryption key authentication,
wherein the encryption key generation data acquisition processor for user authentication, which acquires the encryption key generation data for user authentication when the user remembers and touches the pixel again at the same position as the pixel designated by the touch during the user encryption key registration in the displayed image data again by the encryption key generation image upload processor for user authentication, comprises one of:
(a) a processor configured to reacquire biometrics of the user from the user using a biometrics input/output device, confirm that users are identical to each other by comparing the reacquired biometrics of the user with the previously acquired and stored biometrics of the user, and then acquire, when the user remembers and touches the pixel again at the same position as the pixel designated by a touch during user encryption key generation in the displayed image data again, coordinate values of the pixel touched again and color values of the pixel touched again; and
(b) a processor configured to reacquire, when the user remembers and touches the pixel again at the same position as the pixel designated by the touch during the user encryption key registration in the displayed image data again, biometrics of the user and compare the reacquired biometrics of the user with the biometrics of the user stored by the user biometric recognition processor and simultaneously acquire coordinate values of the pixel touched again and color values of the pixel touched again.

5. The user authentication and signature device of claim 4, wherein the encryption key generation processor for user authentication configured to generate the encryption key for user authentication by encrypting touch data of the user acquired again and the stored biometrics of the user comprises any one of:
(a) the encryption key generation processor for user authentication configured to select at least one of the coordinate values of the pixel touched again, the color values of the pixel touched again, and the biometrics of the user acquired from the user using the biometrics input/output device and stored in the information device memory of the user, encrypt each piece of the selected values, and generate, as the encryption key for user authentication, any one of data obtained by combining the encrypted pieces of data, data obtained by combining one or more of the encrypted pieces of data and a non-encrypted data, and data obtained by re-encrypting a combined data; and
(b) the encryption key generation processor for user authentication configured to combine at least two of the coordinate values of the pixel touched again, the color values of the pixel touched again, and the biometrics of the user acquired from the user using the biometrics input/output device and stored in the information device memory of the user, encrypt the combined data, and then generate, as the encryption key for user authentication, any one of the encrypted data, data obtained by combining the combined and encrypted data and the non-encrypted data, and data obtained by re-encrypting the combined data.

6. The user authentication and signature device of claim 4, wherein generating of the encryption key for user authentication by re-encrypting the reacquired coordinate values of a representative pixel of a touch point, the color values of the representative pixel, or the stored biometrics of the user comprises generating the encryption key for user authentication by encrypting the reacquired coordinate values of the representative pixel, the color values of the representative pixel, or the stored biometrics of the user using a one-way hash function or an elliptic curve equation.

7. A user authentication and signature method comprising:
acquiring biometrics information of a user from the user using a biometrics input/output device of a user information device and then storing the biometrics information in a memory device in a user biometrics processor of the user information device;
receiving an encryption key (password) registration request from the user;
displaying, on a touch display of the user information device, image data selected by the user or an image data processor from among pieces of image data stored in an image storage device of the user information device by uploading the selected image data in response to the encryption key registration request;
when the user designates a pixel at a specific position in the image data displayed on the touch display of the user information device by touching the pixel, acquiring coordinate values of the touch pixel and color values of the touch pixel as encryption key generation data for user registration; and
combining and encrypting the coordinate values of the touch pixel and the color values of the touch pixel or biometrics data of the user stored in an information device memory of the user and generating an encryption key for user registration with a combined and encrypted data,
wherein the acquiring of the coordinate values of the touch pixel and the color values of the touch pixel as the encryption key generation data for user registration when the user designates the pixel at the specific position in the image data displayed on the touch display of the user information device by touching the pixel comprises at least one of:
(a) reacquiring biometrics of the user from the user using the biometrics input/output device, confirming that users are identical to each other by comparing the reacquired biometrics of the user with the previously acquired and stored biometrics of the user, and then acquiring coordinate values of the touch pixel and color values of the touch pixel; and
(b) reacquiring biometrics of the user from the user, comparing the reacquired biometrics of the user with the biometrics of the user stored by a user biometrics verification processor, and simultaneously acquiring coordinate values of the touch pixel and color values of the touch pixel.

8. The user authentication and signature method of claim 7, wherein the combining and encrypting of the coordinate values of the touch pixel and the color values of the touch pixel or the stored biometrics data of the user and generating of the encryption key for user registration with the combined and encrypted data comprises one of:
(a) selecting at least one of the coordinate values of the touch pixel, the color values of the touch pixel, and the biometrics of the user acquired from the user using the biometrics input/output device and stored in the information device memory of the user, encrypting each piece of the selected values, and generating, as the encryption key for user registration, any one of data obtained by combining the encrypted pieces of data, data obtained by combining one or more of the encrypted pieces of data and a non-encrypted data, and data obtained by re-encrypting the combined data; and
(b) combining at least two of the coordinate values of the touch pixel, the color values of the touch pixel, and the biometrics of the user acquired from the user using the biometrics input/output device and stored in the information device memory of the user, encrypting the combined data, and generating, as the encryption key for user registration, any one of the encrypted data, data obtained by combining the combined and encrypted data and the non-encrypted data, and data obtained by re-encrypting the combined data.

9. The user authentication and signature method of claim 7, wherein the generating of the encryption key for user registration by encrypting the acquired coordinate values of the touch pixel, the acquired color values of the touch pixel, or the biometrics of the user comprises generating the encryption key for user registration by encrypting the acquired coordinate values of the touch pixel, the acquired color values of the touch pixel, or the biometrics of the user using a one-way hash function or an elliptic curve equation.

10. A user authentication and signature method comprising:

receiving an authentication request for a registered user encryption key;

displaying, on a touch display of a user information device, image data selected for an encryption key for user registration by a user or an image data processor from among pieces of image data stored in an image storage device of the user information device again by uploading the selected image data in response to the authentication request for the user encryption key;

acquiring encryption key generation data for user authentication when the user remembers and touches a pixel again at the same position as the pixel designated by a touch during registration of a user encryption key in the displayed image data again;

generating an encryption key for user authentication by encrypting the encryption key generation data for user authentication; and making a decision by comparing the generated encryption key again by an encryption key generation processor for user authentication with an encryption key already stored in the user information device or a device requesting user encryption key authentication, wherein the acquiring of the encryption key generation data for user authentication when the user remembers and touches the pixel again at the same position as the pixel designated by the touch during registration of the user encryption key in the displayed image data again comprises one of:

(a) reacquiring biometrics of the user from the user using a biometrics input/output device, confirming that users are identical to each other by comparing the reacquired biometrics of the user with the previously acquired and stored biometrics of the user, and then acquiring, when the user remembers and touches the pixel again at the same position as the pixel designated by the touch during the registration of the user encryption key in the displayed image data again, coordinate values of the pixel touched again and color values of the pixel touched again; and (b) re-acquiring, when the user remembers and touches the pixel again at the same position as the pixel designated by the touch during the registration of the user encryption key in the displayed image data again, biometrics of the user, comparing the reacquired biometrics of the user with the biometrics of the user stored by a user biometric recognition processor, and simultaneously acquiring coordinate values of the pixel touched again and color values of the pixel touched again.

11. The user authentication and signature method of claim 10, wherein generating of the encryption key for user authentication by re-encrypting the coordinate values of the pixel touched again and the color values of the pixel touched again or stored biometrics information of the user comprises one of:

(a) selecting at least one of the coordinate values of the pixel touched again, the color values of the pixel touched again, and the biometrics of the user acquired from the user using the biometrics input/output device and stored in an information device memory of the user, encrypting each piece of the selected values, and generating, as the encryption key for user authentication, any one of data obtained by combining the encrypted pieces of data, data obtained by combining one or more of the encrypted pieces of data and a non-encrypted data, and data obtained by re-encrypting a combined data; and (b) combining at least two of the coordinate values of the pixel touched again, the color values of the pixel touched again, and the biometrics of the user acquired from the user using the biometrics input/output device and stored in the information device memory of the user, encrypting the combined data, and then generating, as the encryption key for user authentication, any one of the encrypted data, data obtained by combining the combined and encrypted data and the non-encrypted data, and data obtained by re-encrypting the combined data.

12. The user authentication and signature method of claim 10, wherein generating of the encryption key for user authentication by re-encrypting the reacquired coordinate values of a representative pixel of a touch point, the color values of the representative pixel, or the stored biometrics of the user comprises generating the encryption key for user authentication by encrypting the reacquired coordinate values of the representative pixel, the color values of the representative pixel, or the stored biometrics of the user using a one-way hash function or an elliptic curve equation.

* * * * *